W. BARRY.
MAIL DISTRIBUTING APPARATUS.
APPLICATION FILED JULY 3, 1902.
919,810.
Patented Apr. 27, 1909.
15 SHEETS—SHEET 1.
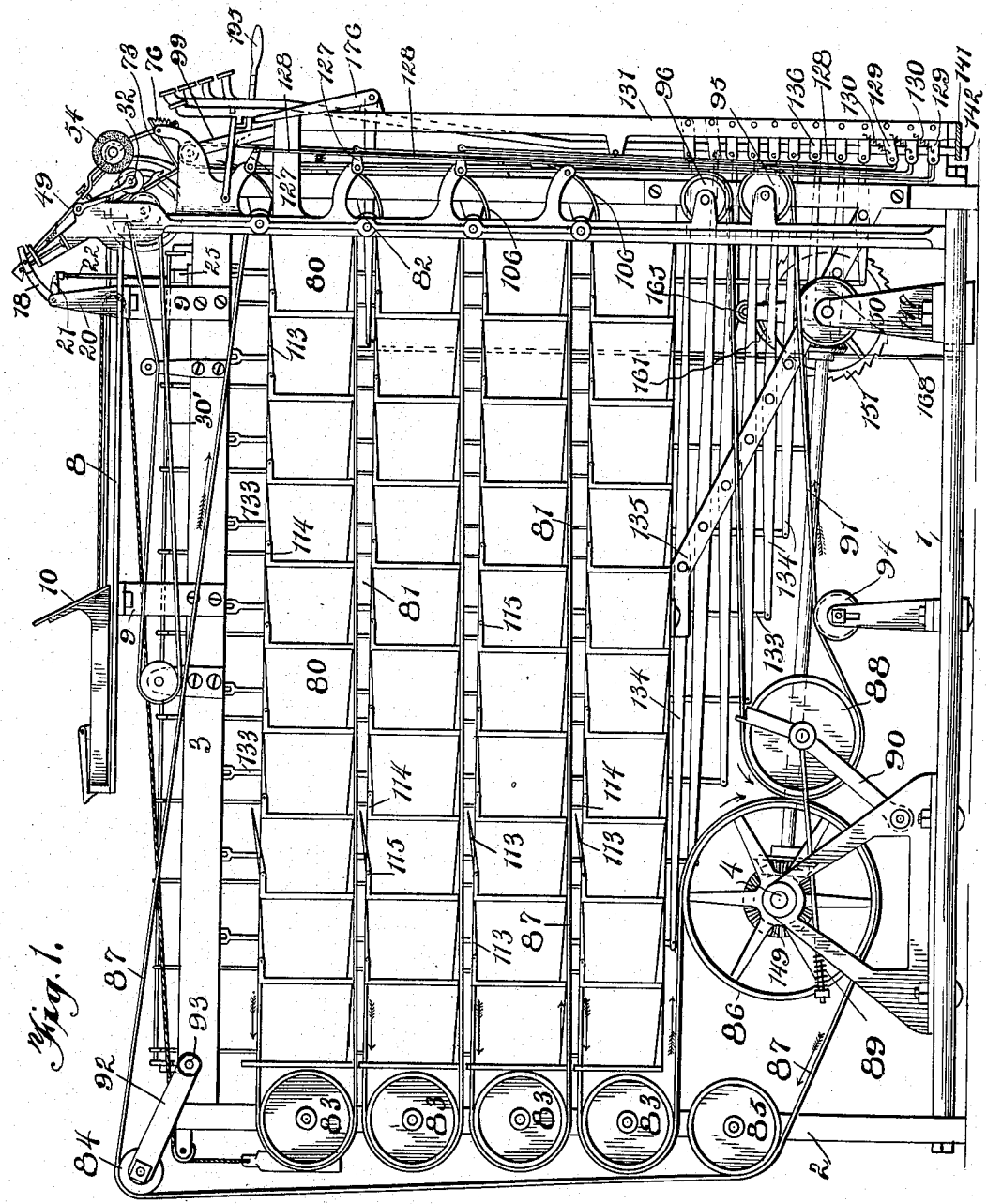
Witnesses
Geo. E. Frech
E. R. Peck
Inventor
William Barry.
By Hubert E. Beck
Attorney

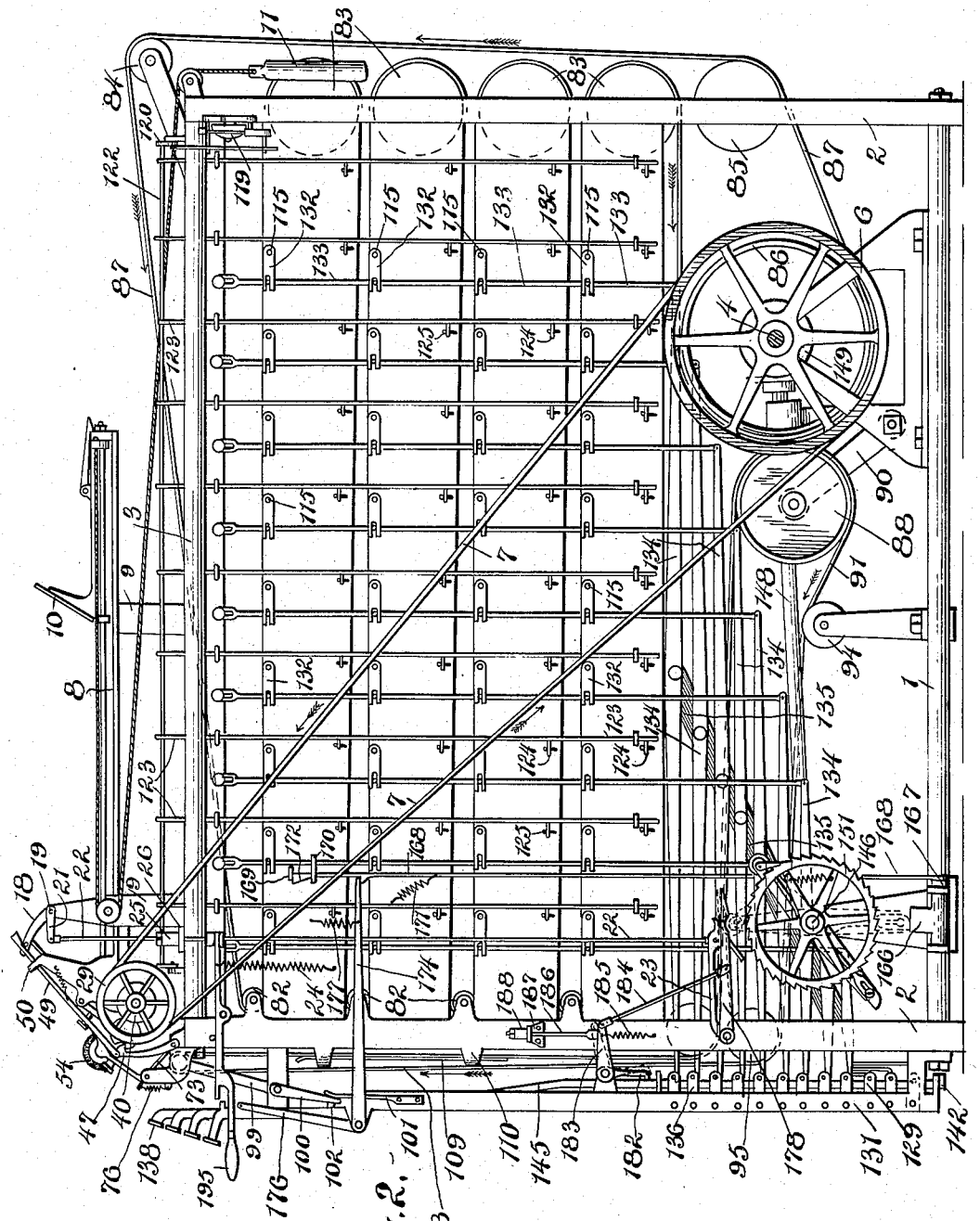

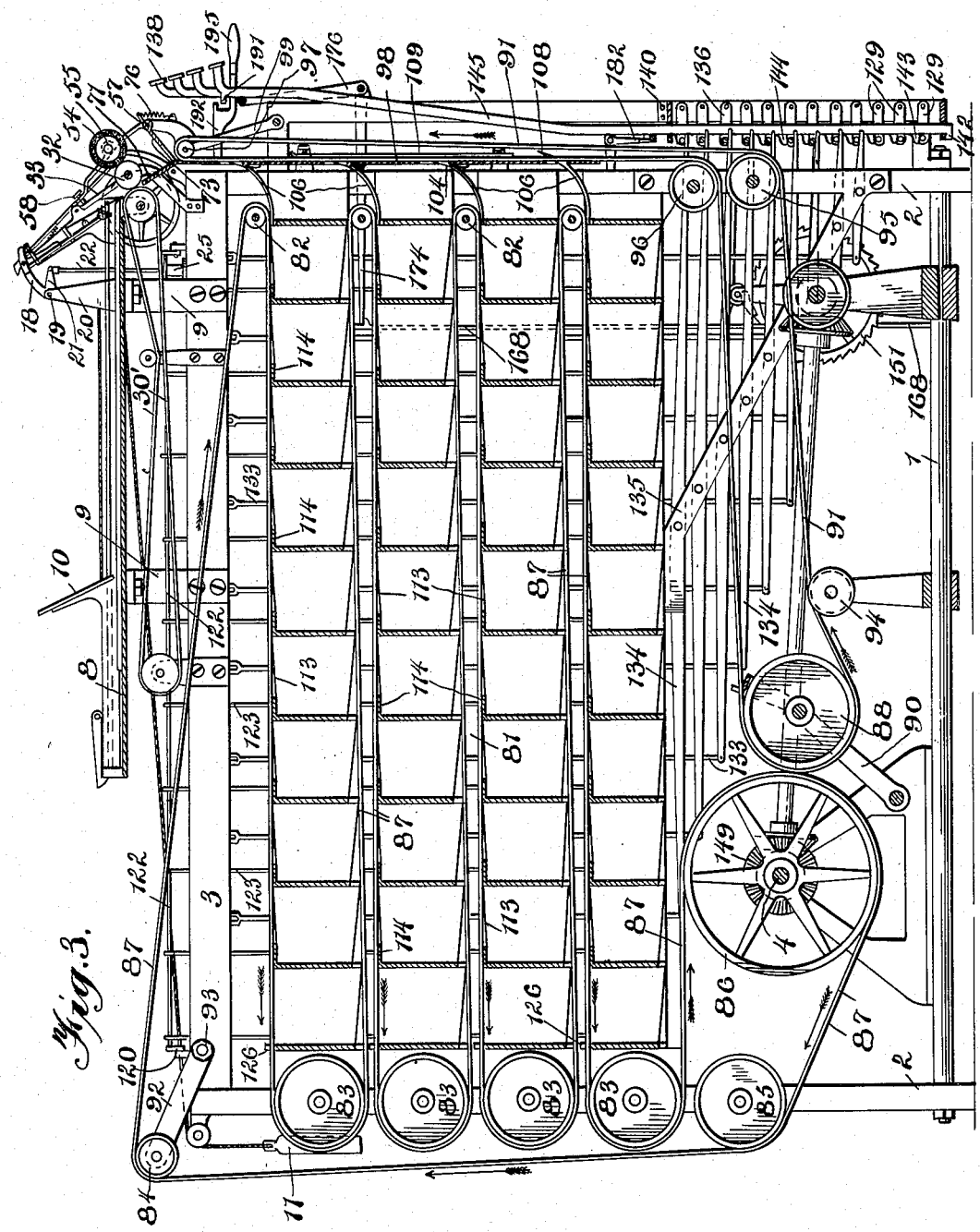

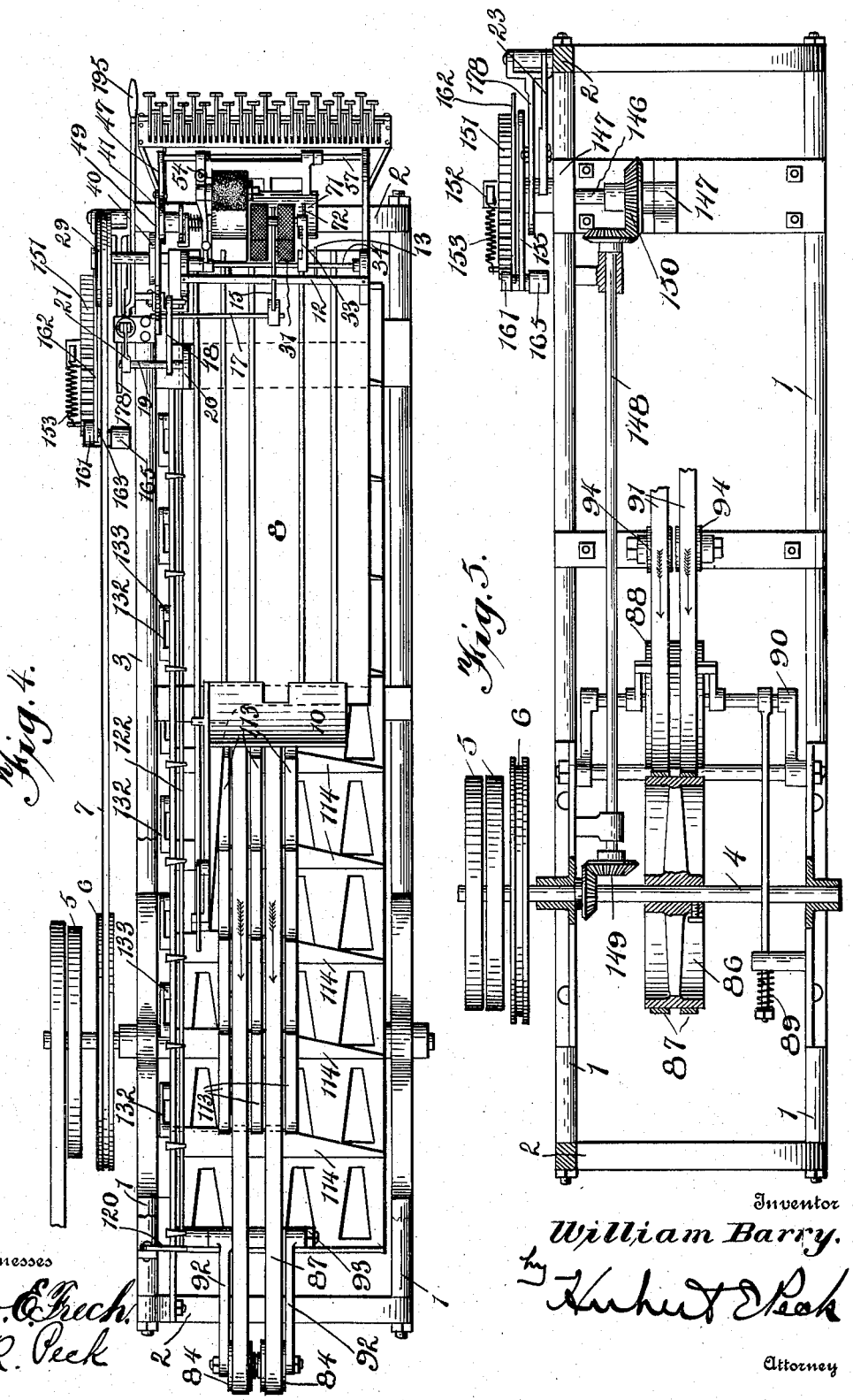

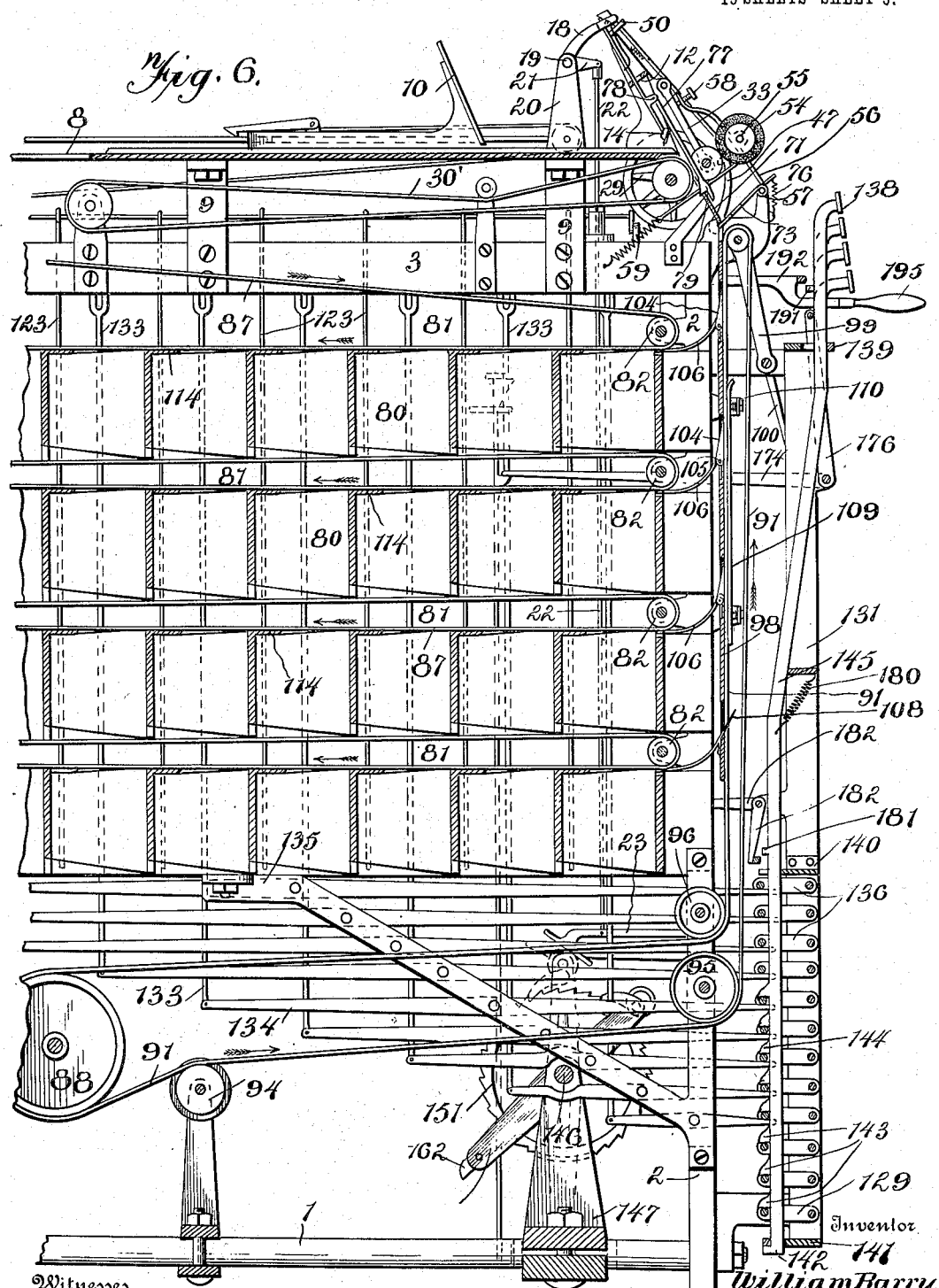

W. BARRY.
MAIL DISTRIBUTING APPARATUS.
APPLICATION FILED JULY 3, 1902.

919,810.

Patented Apr. 27, 1909.
15 SHEETS—SHEET 6.

Witnesses
Geo. E. Frech.
E. R. Peck.

Inventor
William Barry.
By
Hubert Peck
Attorney

W. BARRY.
MAIL DISTRIBUTING APPARATUS.
APPLICATION FILED JULY 3, 1902.
919,810.
Patented Apr. 27, 1909.
15 SHEETS—SHEET 7.
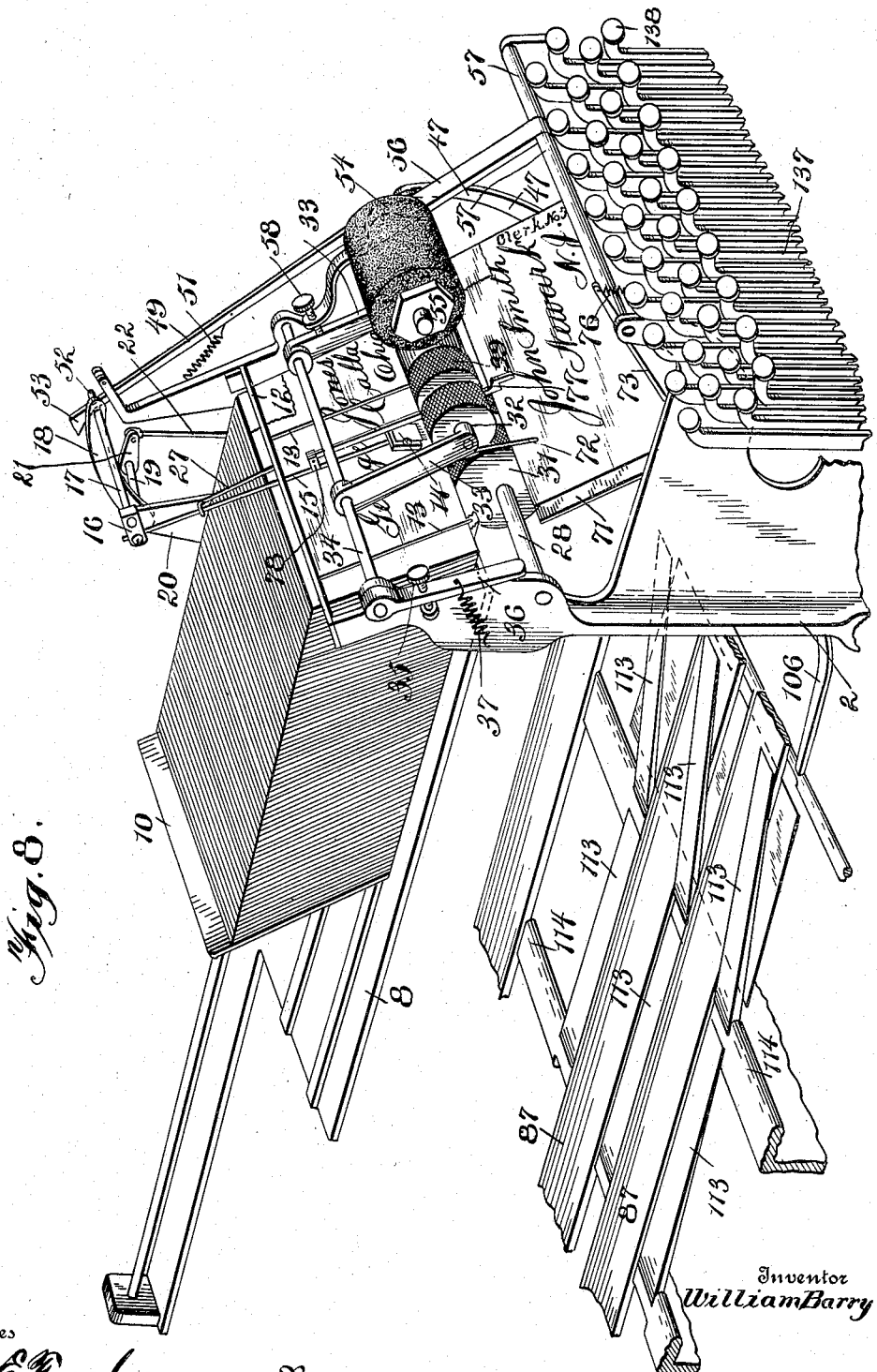

W. BARRY.
MAIL DISTRIBUTING APPARATUS.
APPLICATION FILED JULY 3, 1902.
919,810.
Patented Apr. 27, 1909.
15 SHEETS—SHEET 8.
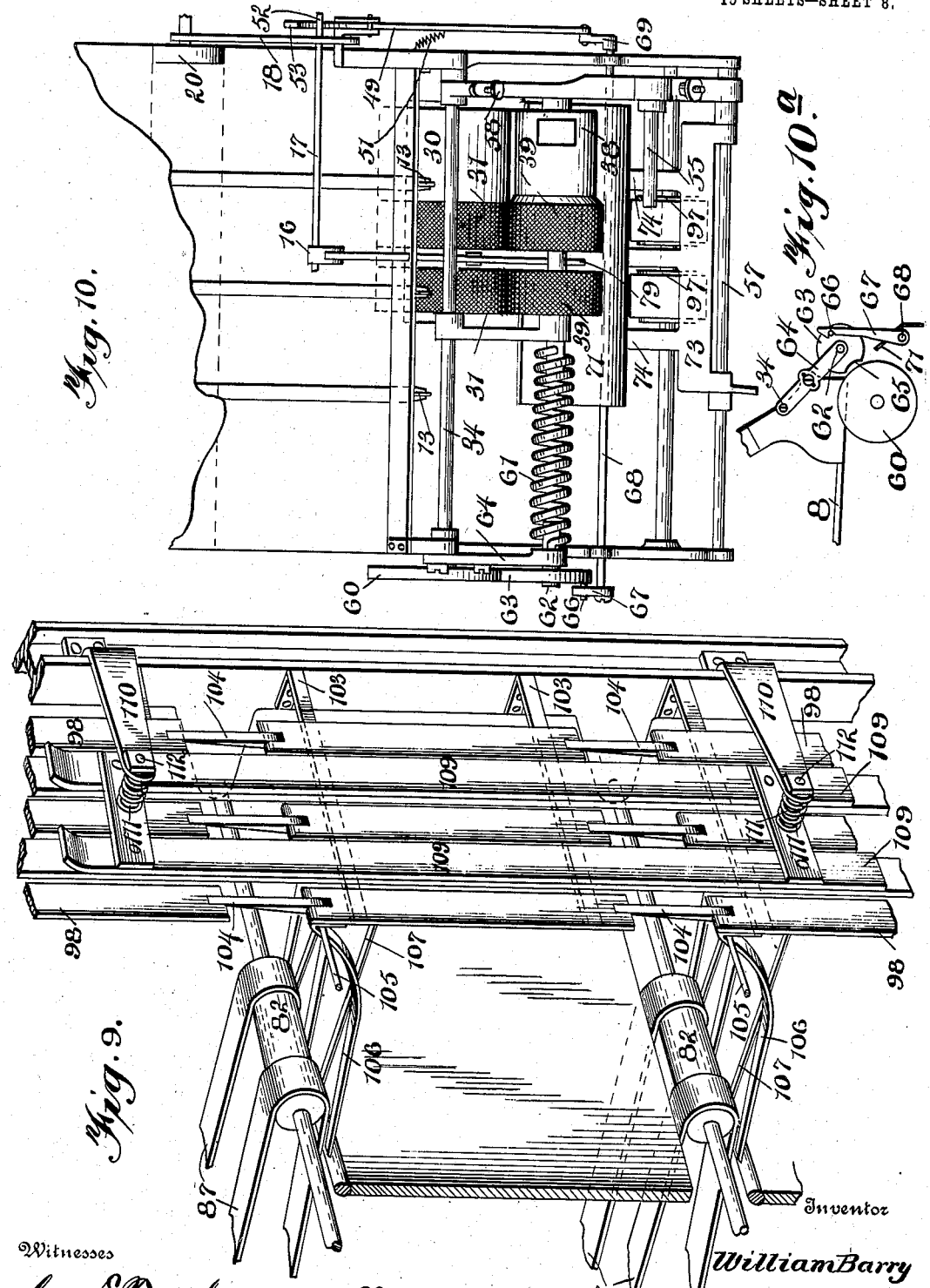

W. BARRY.
MAIL DISTRIBUTING APPARATUS.
APPLICATION FILED JULY 3, 1902.

919,810.

Patented Apr. 27, 1909.
15 SHEETS—SHEET 9.

Witnesses
Geo. E. French
E. R. Peck

Inventor
William Barry.
by Hubert E. Peck
Attorney

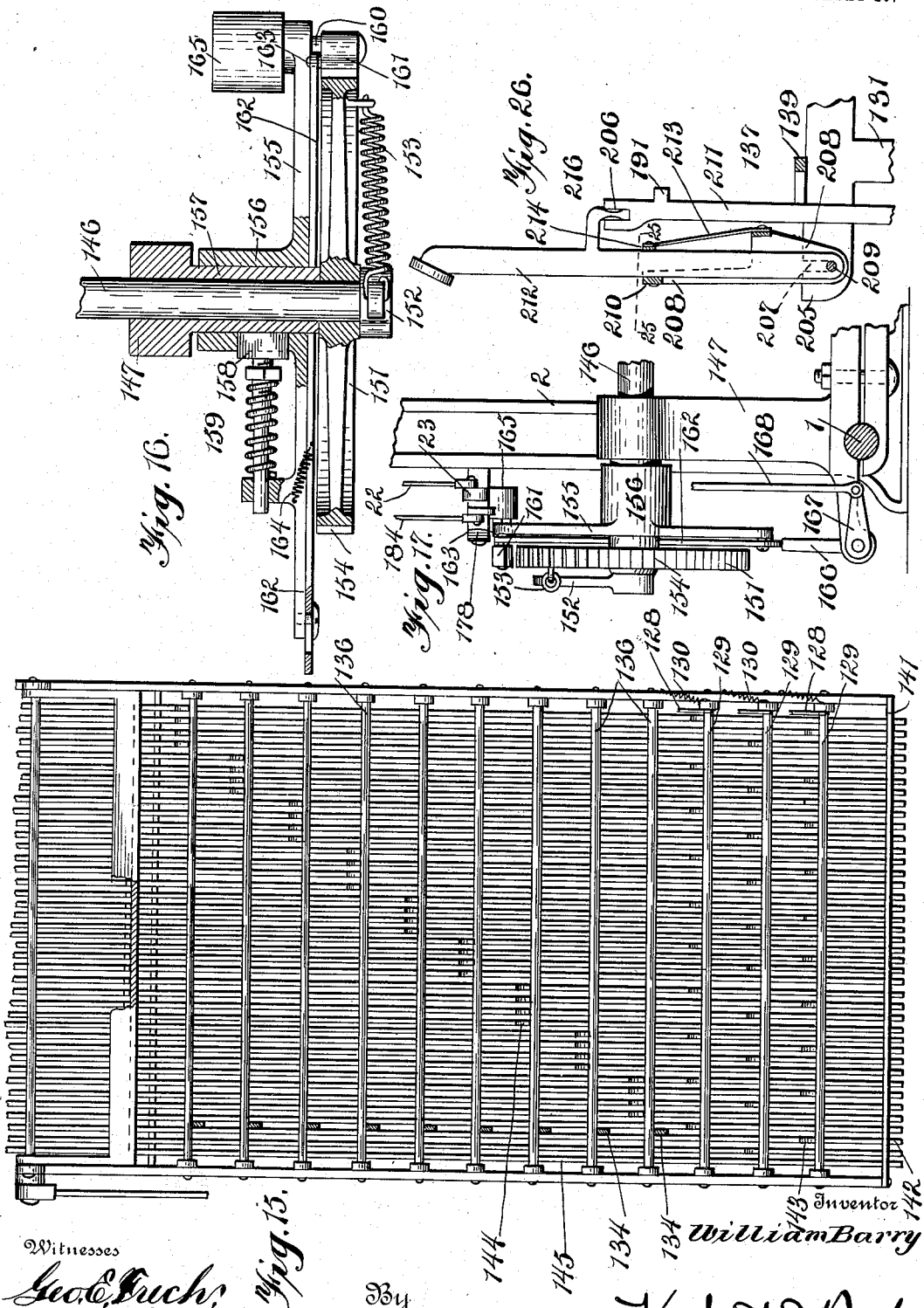

W. BARRY.
MAIL DISTRIBUTING APPARATUS.
APPLICATION FILED JULY 3, 1902.
919,810.
Patented Apr. 27, 1909.
15 SHEETS—SHEET 11.
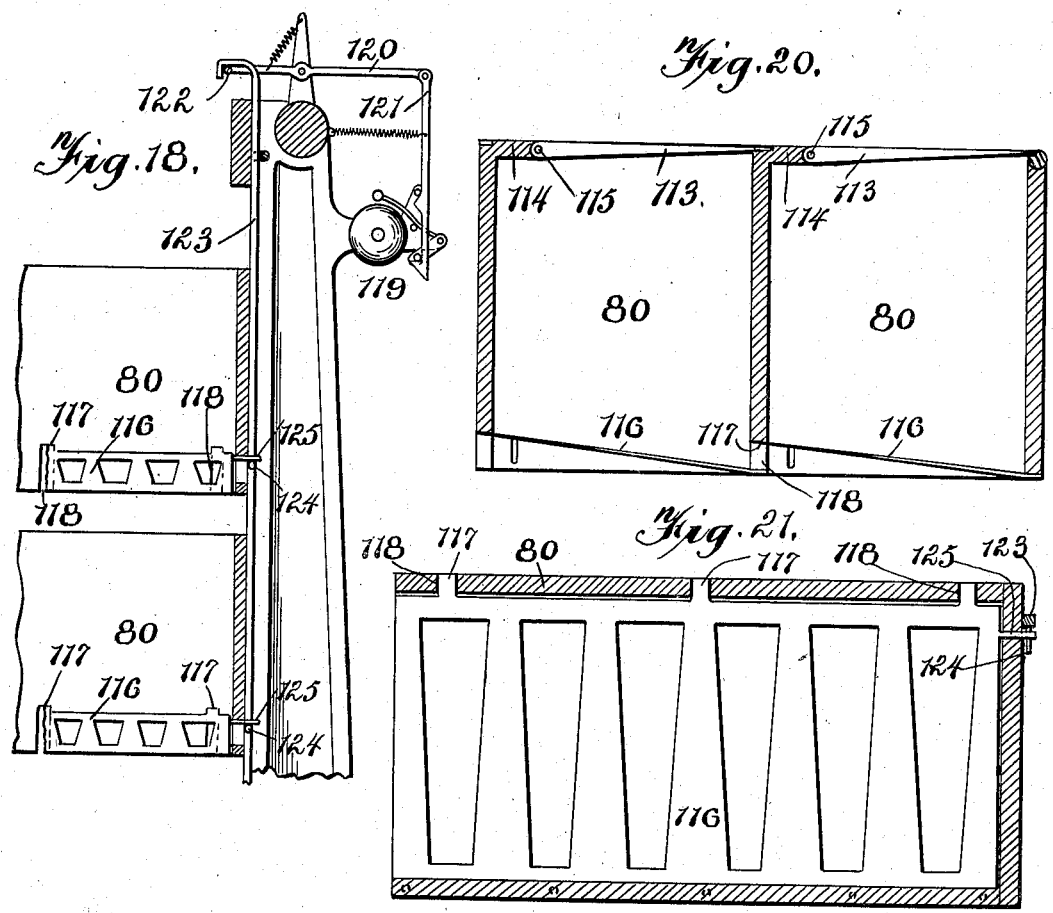
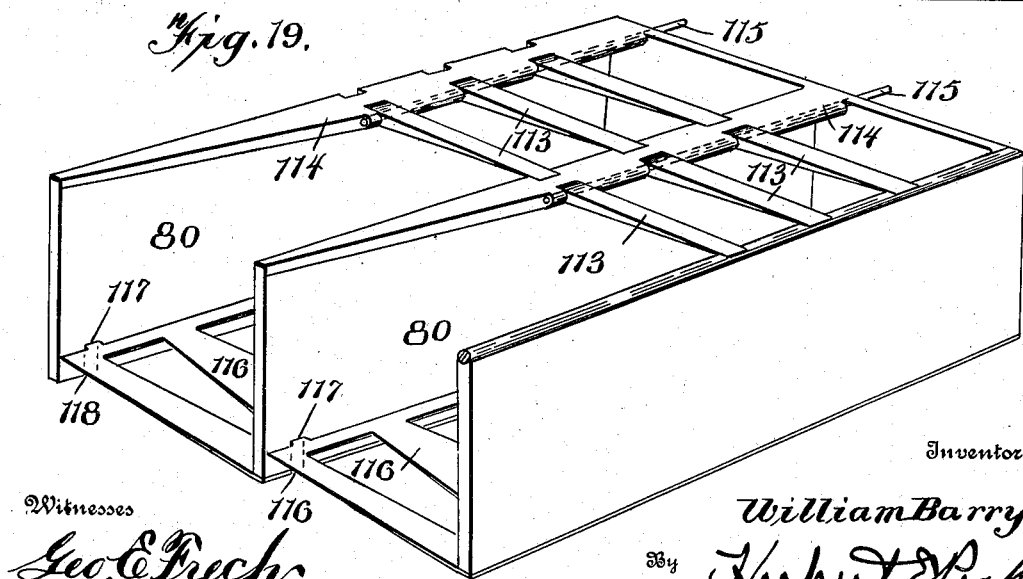
Witnesses
Geo. E. Frech.
E. R. Pick.
Inventor
William Barry,
By Hubert Pick
Attorney

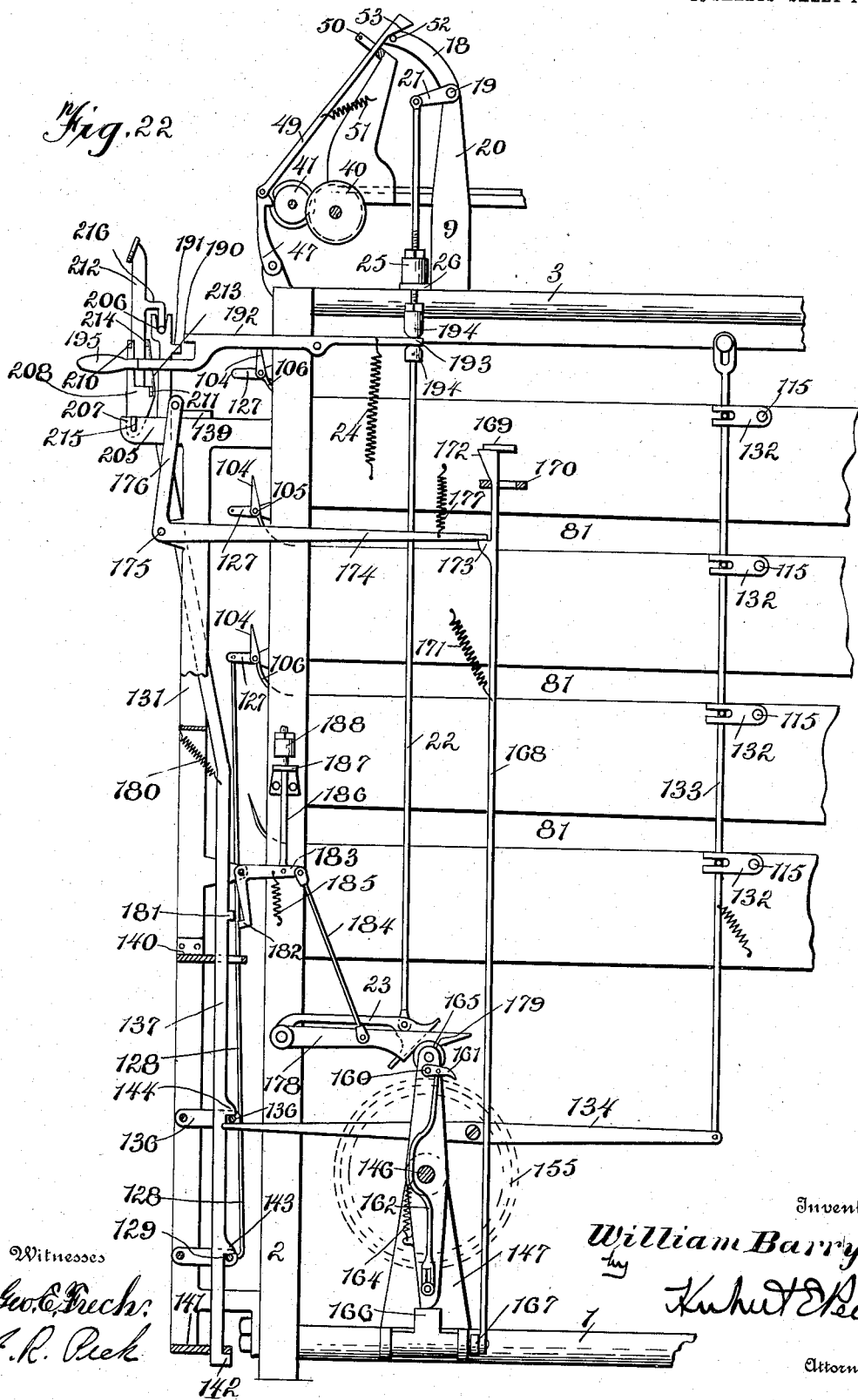

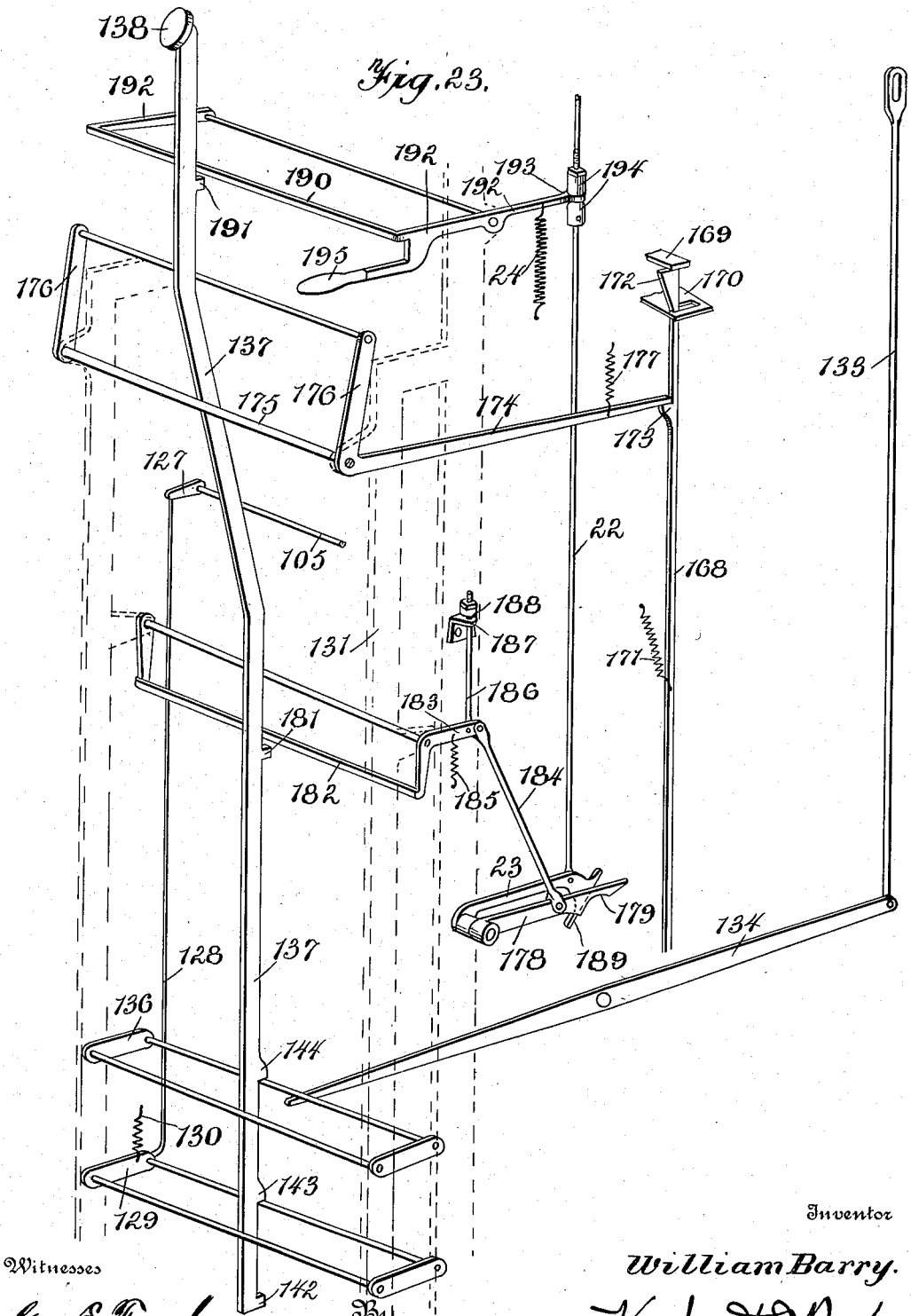

W. BARRY.
MAIL DISTRIBUTING APPARATUS.
APPLICATION FILED JULY 3, 1902.

919,810.

Patented Apr. 27, 1909.
15 SHEETS—SHEET 14.

Witnesses
Geo. E. Buch.
E. R. Peck

Inventor
William Barry
By Hubert E. Peck
Attorney

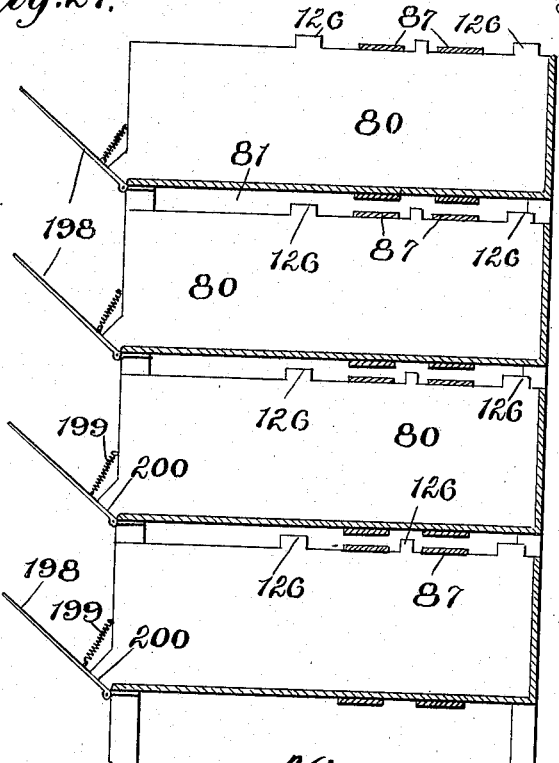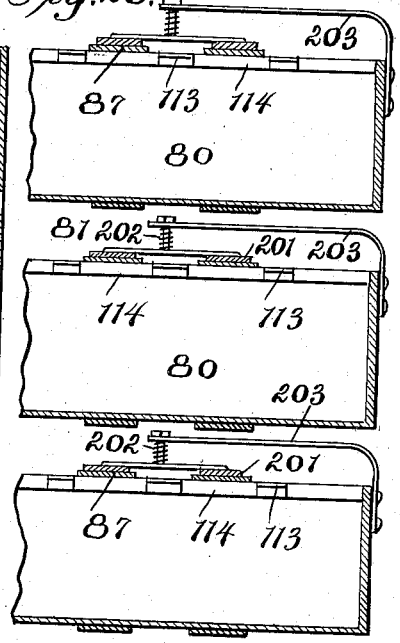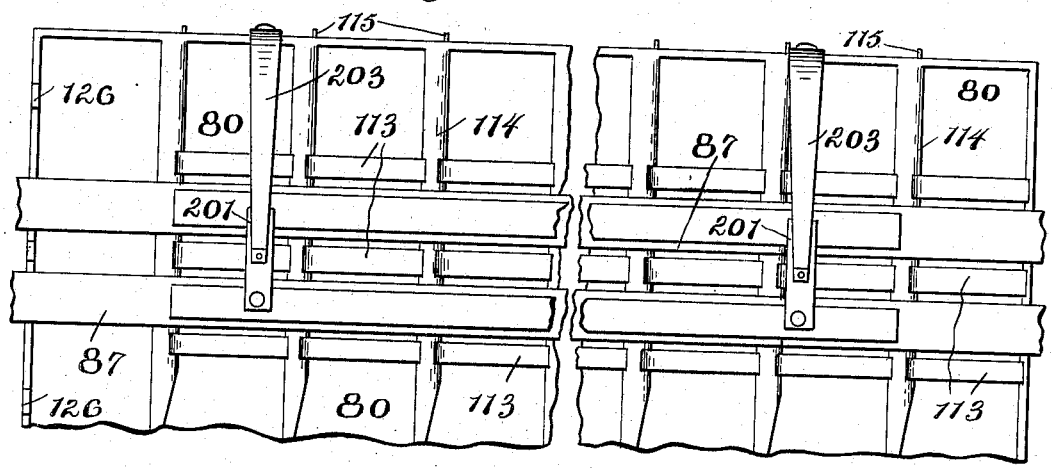

UNITED STATES PATENT OFFICE.

WILLIAM BARRY, OF OSWEGO, NEW YORK.

MAIL-DISTRIBUTING APPARATUS.

No. 919,810.　　　Specification of Letters Patent.　　Patented April 27, 1909.

Application filed July 3, 1902. Serial No. 114,317.

*To all whom it may concern:*

Be it known that I, WILLIAM BARRY, a citizen of the United States, residing at Oswego, county of Oswego, State of New York, have invented certain new and useful Improvements in Mail-Distributing Apparatus; and I do hereby declare the following to be a full, clear, and exact description of the invention, such as will enable others skilled in the art to which it appertains to make and use the same.

This invention relates to certain improvements in the various machines or apparatus that I have heretofore produced for sorting or distributing mail matter; and the objects and nature of the invention will be readily understood by those skilled in the art in the light of the following descriptions of the constructions shown in the accompanying drawings, merely as illustrative examples, from among many other constructions within the spirit and scope of my invention.

My invention consists in certain novel features in construction, in combinations and in arrangements of parts, as more fully and particularly pointed out and described hereinafter.

Figure 7:
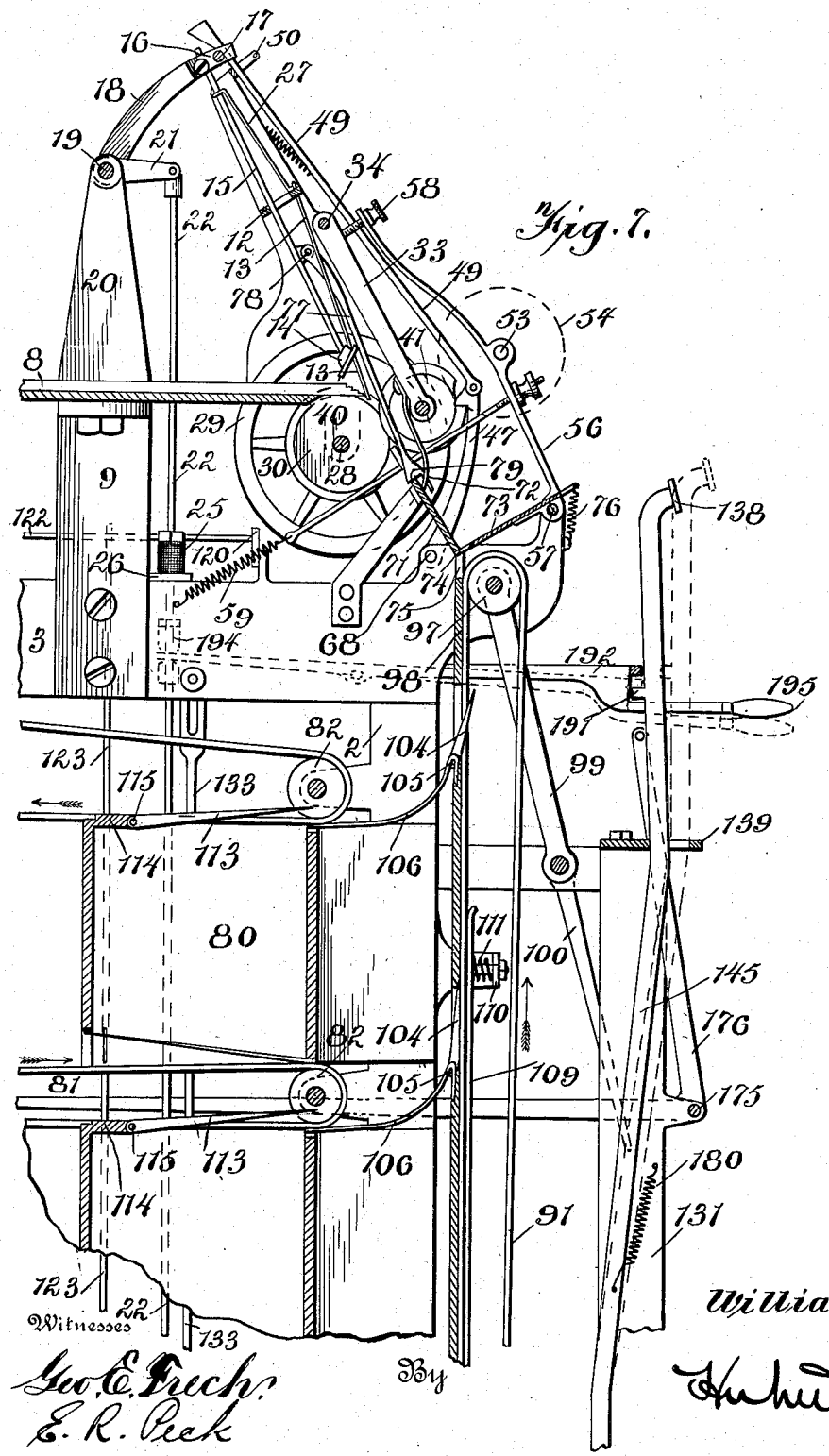
Figure 11:
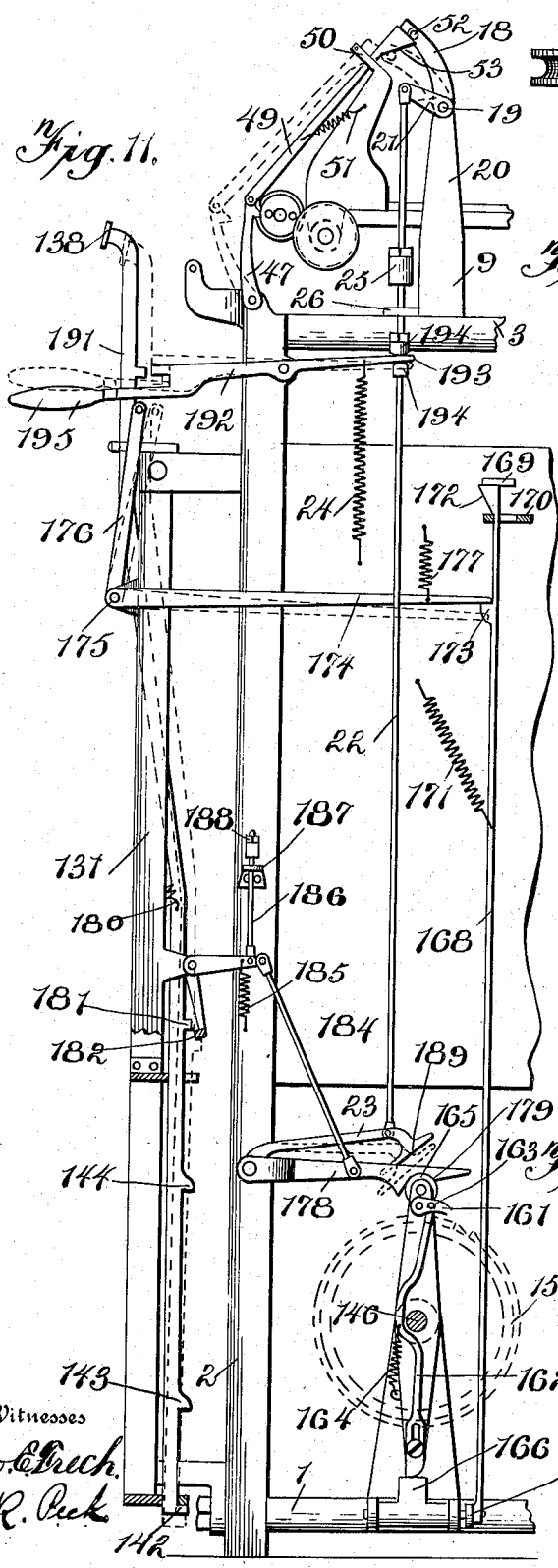
Figure 12:
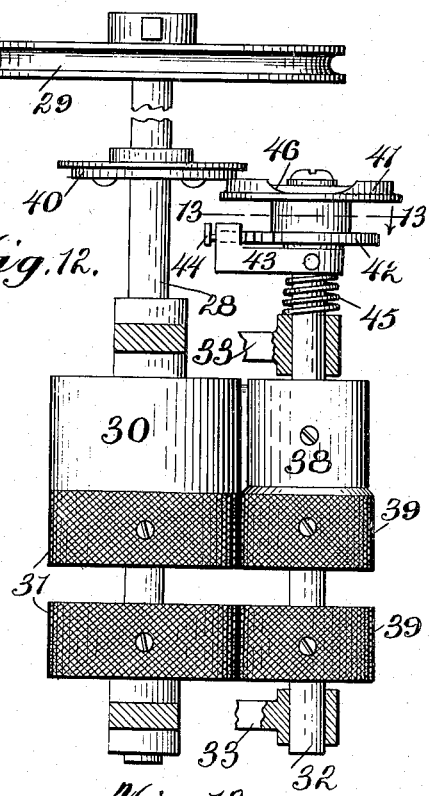
Figure 13:
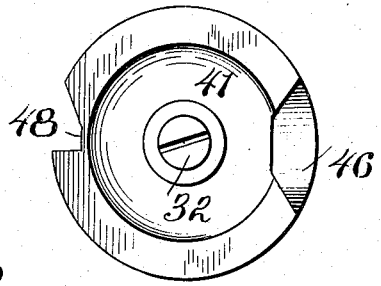
Figure 14:
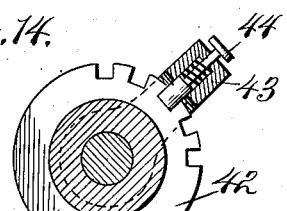
Figure 24:
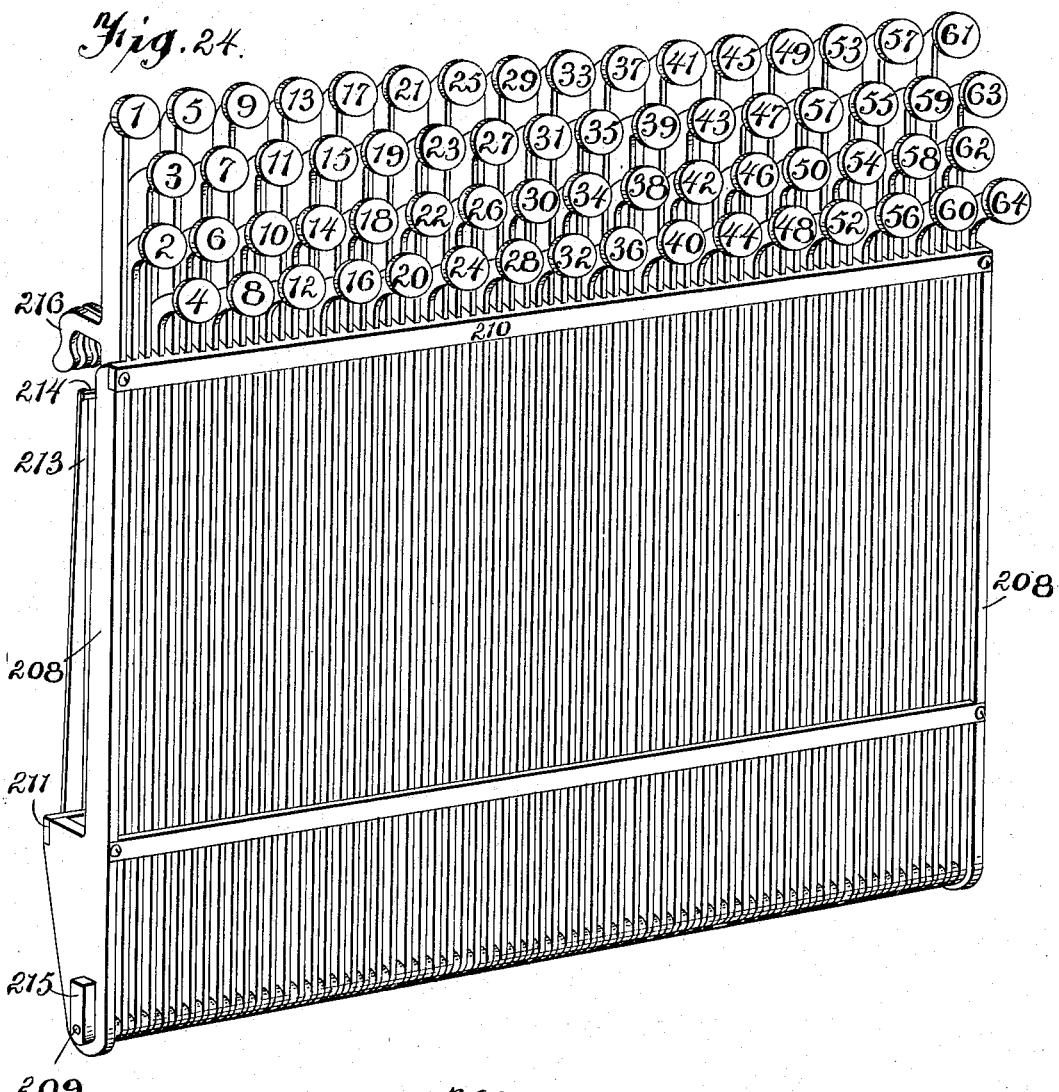
Figure 25:
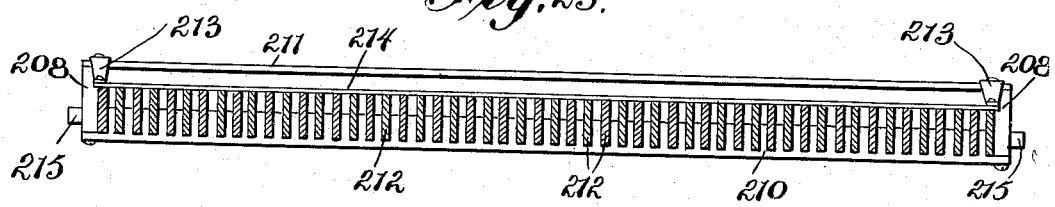

Referring to the accompanying drawings which show examples within the spirit and scope of my invention—Figure 1, is a side elevation of the apparatus looking at the open ends of the boxes, one key lever being shown depressed and the corresponding letter gates or deflectors opened to cause deposit of a letter in the eighth box of the top row, the striker operating arm being shown in its normal position, the printing mechanism being shown provided with an endless impression belt. Fig. 2, is a side elevation looking at the closed ends of the boxes, the key levers and gates being in their normal positions, the endless impression belt not being shown, the striker arm in dotted lines shown in its normal position and in full lines to one side. Fig. 3 is a vertical longitudinal section through the apparatus, the letter boxes being shown in cross section and the operative parts in their normal positions, the endless impression belt being shown. Fig. 4, is a top plan view of the apparatus, the striker being shown to one side of its normal position. Fig. 5, is a horizontal section taken in a plane below the case of boxes and showing the driving gearing, portions of the belts and trip mechanism being shown. Fig. 6, is an enlarged vertical section through the front portion of the apparatus, the trip or driving arm or striker being shown moved partially around from its normal position so that the same can be seen, the remaining operative parts however being shown in their normal positions in full lines, the said arm or striker being shown in normal position in dotted lines. Fig. 7, is a vertical sectional view, enlarged, through the upper front portion of the apparatus, certain gates being shown opened, a key lever shown depressed, and in dotted lines shown in its normal position. Fig. 8, is a detail perspective view, parts being broken away, showing the support or way for the common pile or stack of mixed mail matter, the initial feeder and printing mechanism, the bank or series of keys showing letters in said way, and a letter being shown held at the inspection point exposed to the view of the operator after being stamped and before being discharged into the distributing letter moving mechanism. Fig. 9, is a detail perspective view, parts being broken away, among other features partially showing the inner plies of the vertical or main letter way belts and the spring pressure device coöperating with said plies of the belts. Fig. 10, is a detail top plan view, parts being broken away, of the printing mechanism, the constructions being different in some particulars from those shown in figures of the drawing previously described. Fig. 10ª, is a partially diagrammatical end view of the mutilated friction gearing and stop mechanism of Fig. 10. Fig. 11 is a detail fragmentary or somewhat diagrammatical view, dotted lines showing the driving ratchet wheel, certain parts being shown in one position in full lines and in the opposite positions in dotted lines, the initial feeder operating device being shown swung down as when operated by hand to feed the letters to the distributing belts in rapid succession. Fig. 12, is a detail detached plan view of the printing, impression and feed rolls, of the construction shown in Figs. 2, 4, 7, 8, and 11, showing the mutilated friction driving gearing between the impression and printing roll shafts. Fig. 13, is an end or face view of the friction disk on the end of the printing roll shaft of the construction of Fig. 12. Fig. 14, is a section on line 13—13, Fig. 12 looking in the direction of the arrow. Fig. 15, is a sectional elevation looking from the rear at the lower portions of the key levers, showing the swinging letter gate operating bails, the box gate operating levers shown in section, the key lever locking bar being partially broken away. Fig. 16, is a detail section through the ratchet driving wheel, the operating trip or striker arm, and showing a spring brake to stop rotation of said striker when thrown out of gear with the power. Fig. 17, is a detail edge elevation, of the ratchet wheel, and coöperating parts, showing the trip devices, striker arm and adjacent parts, said arm being shown in its normal position and held out of gear with the ratchet wheel by the trip. Fig. 18, is a sectional elevation, with parts removed, partially showing two boxes in longitudinal section with upwardly springing floors and an alarm or signal mechanism operated thereby. Fig. 19, is a detail perspective view of two detached letter boxes, provided with the yielding floors. Fig. 20, is a cross section of the boxes shown in Fig. 19. Fig. 21, is a horizontal section of one of the boxes provided with a yielding bottom. Fig. 22, is a sectional side elevation of the front end of the distributer, the parts being shown in their normal inactive positions, the ratchet driving wheel being indicated by dotted lines, the conveyer belts not being shown, and other parts being omitted to more clearly show the parts operated by and operating on a key lever and the feeder operating connections. Fig. 23, is in the nature of a detached perspective or a diagrammatical view of one key lever and the various elements engaging the same or coöperating therewith. Fig. 24, is a detached perspective view of the removable or attachable key board shown applied in Fig. 22. Fig. 25, is a cross section of the detachable key board, shown in Fig. 24, taken in the plane of the line 25—25, Fig. 26. Fig. 26, is an enlarged detail sectional end elevation of the detachable key board applied as in Fig. 22, showing the upper ends of the key levers and the manner of coupling the finger pieces or levers of the key board detachably thereto. Fig. 27, is a detail section taken vertically through the rear end letter boxes of the case, showing hinged upwardly springing shelves arranged at the open ends of the boxes of each horizontal row. Fig. 28, is a vertical section taken through several letter boxes and transversely through the conveyer belts, showing pressure devices to yieldingly hold the conveyer belts down and maintain said belts against the letters thereunder with sufficient pressure to insure proper movement of the letters. Fig. 29, is a top plan view of a row of letter boxes and the conveyer belts and pressure device shown in Fig. 28, parts being broken away.

The specific example illustrated receives the pack or bundle of mixed letters, which are to be individually stamped and then distributed or sorted, on a horizontally disposed feed way arranged above the case of letter boxes and extending approximately to the front of the apparatus. The letters are arranged vertically on edge with their addressed faces to the front and the stamps in the upper right hand corners. A device is provided to press and feed the letters forwardly in the feed way against stops at the front end thereof. A printing mechanism is located below the front end of the feed way, and a feeder moves the letters, one at a time, down into the printing mechanism which imprints each letter and moves the same downwardly to an exposed inspection point or station and against a stop device which holds the letter exposed to the eye of the operator so that he can read the addressed face thereof and examine the letter and see that it is properly printed and remove any other letter which may have moved down by accident or by adhering to the first letter. When the operator has read the address and determined that the letter is in condition for distribution, he moves the key corresponding to the letter box to which he desires the letter delivered, thereupon a pusher or other letter mover forces said inspected letter down from its temporary resting place and exposed position and past said stop device and into contact with the vertical main way conveyer which moves the letter rapidly down and discharges the same laterally into any one of the branch or box passages whereupon the letter is seized by the conveyer of said box passage and carried rearwardly to and deposited in the particular predetermined box. The vertical or main way conveyer shown in the particular example consists of two parallel endless friction belts moving as one belt and continuously driven while the machine is in operation. The branch or box passages are formed by separating the boxes into horizontal separated rows so that the letters move over the open tops of the boxes. The branch or box passage conveyers in this specific example are composed of one or more, usually two, parallel endless belts moving as one belt, and so arranged as to form all the box passage conveyers, and said belts are continuously driven while the machine is in action, and, if desired, the main conveyer belts and the box passage conveyer belts are driven by friction one from the other. Swinging gates or deflectors are provided to deflect the letters from the main passage conveyer into any one of the branch passages and from the branch passages into any box. A bank of keys or key board is arranged adjacent to the intermediate exposed platform, station or point at which each letter is stopped for inspection, and usually said bank of keys is arranged about in front of and just below said exposed inspection point so that the operator, located in front of the machine, can easily read the address of the letter and the characters or indication on any one of the keys almost at the same glance and without turning or moving his head. The letter conveying belts, and the impression surface and feed wheel on the same shaft therewith, are usually continuously driven, but the initial feeder, the printing roll and its feed wheel and the intermediate pusher or letter mover are normally inactive or disconnected from the driving means. When a key lever is moved, a trip mechanism is at once released which throws the driving means into gear or operative connection with the particular key lever moved to depress the same and by power move the letter gates controlled thereby, also with means which lock the remaining key levers against operative movement, and also with means to operate the initial feeder and said pusher a single stroke, and also with means to release the printing roll and permit usually only a single operative movement thereof. The trip mechanism is usually so arranged as to make one complete revolution and thereupon operate devices to automatically break the operative connection with the driving power and automatically release the key lever lock, permit locking of the printing roll against rotation and permit automatic restoration of the key lever and other parts to their normal inactive positions in readiness for another stroke.

The foregoing brief description of the operation of the specific example is merely for the purpose of making the following description readily understood, and I do not intend to thereby limit my invention to all the features and operations as thus set up.

Referring more specifically to the constructions shown in the accompanying drawings, 1, are the horizontal bottom bars of a strong and rigid vertically disposed frame work carrying the letter boxes and operative and other parts of the apparatus.

2, are the rigid uprights at the ends of the case of boxes, and 3, are the rigid horizontal top bars of the frame above the boxes.

4, is the main drive shaft of the machine arranged transversely beneath the case of boxes and suitably mounted in pillars or other supports rigid with bottom frame bars 1. The drive shaft is suitably coupled with a driving motor, usually by means of belt and pulleys 5, mounted on said shaft. However, the motor might be arranged directly under the case of boxes, or otherwise to suit conditions.

6, is a drive pulley rigid with one end portion of the drive shaft to receive belt 7, for driving the printing mechanism as hereinafter set forth.

8, is a rigid usually elongated feed way, letter bed or floor, suitably arranged with respect to the boxes and distributing mechanism and supported in any suitable manner, as by brackets or arms 9, rigidly secured to the top frame bars and to said letter bed 8. 10, is the follower extending across said letter bed to press the bundle or pile of letters thereon forwardly and uphold the same in the proper position. This follower moves longitudinally of the bed and is provided with a suitable slide moving on a longitudinal guide and means are provided to constantly press the follower toward the front discharge end of the bed. For instance, I show a weight 11, for this purpose connected with the follower slide by a cord, or any other suitable feeding means can be provided. The follower is usually inclined upwardly and rearwardly at its front face, to hold the letters in an inclined position as shown in Fig. 8. The front edge of said letter bed is usually beveled downwardly so that the letters can easily move, one at a time, down from the bed past said edge.

If desired, the letter bed can be formed with longitudinal raised ribs on which the lower edges of the letters rest and slide, and these ribs can project slightly beyond the front edge of the bed proper and be beveled off to form said beveled front edge of the bed, as described. If desired, the beveled faces can be transversely rabbeted or recessed to form shoulders or steps down which the lower edges of the letters slip and which aid in the separation of the letters as the front letter is pressed down by the feeder, by retarding the letters behind the front letter.

The front vertical frame bars 2, are extended upwardly at both sides of the letter bed and are shown provided with a rigid cross bar 12, see Fig. 8, which extends across the front of the letter way, about at the top portions of the letters therein, forming a front stop therefor. I usually provide spring fingers 13, secured to said cross bar 12, and extending downwardly and inclined forwardly with their lower free ends lapping said front beveled edge or edges see Fig. 7, of the letter bed and yieldingly bearing and pressing inwardly against said edge. The front letter of the common pile of mixed letters is pressed forwardly against said springs and assumes the proper inclination to be engaged by the feeder and forced downwardly from the bed and past the lower free ends of said springs, which are designed to co-act with the front edge of the bed to separate or hold back the letters, behind the one being fed from moving down with said letter. The object is to feed down but one letter at a time.

A reciprocating feeder is shown moving vertically at an angle at the front of the letter feed way and transversely of the front face of the front letter thereon.

14, is the feed block or head provided with a series of inwardly and downwardly inclined gripping or needle points. This feed block is rigidly secured to an upwardly extending rod 15, which is, at a point above the letters in the feed way, adjustably secured to a block or arm 16, mounted to turn on a cross rod 17, projecting laterally from the upwardly projecting arm 18, of a vertically swinging bell crank or elbow lever fulcrumed at 19, to a bracket 20, rigid with a top bar 3, of the main frame. The short horizontally disposed arm 21, of said elbow lever is pivotally joined to the vertical reciprocating lift rod 22, extending down outside the closed face of the box case, and at its lower end pivotally joined to the free end of a vertically swinging cam toe or lever 23, at its front end fulcrumed to a front frame upright and extending therefrom about horizontally to be engaged and swung vertically by a striker arm, as hereinafter described, to move the push rod 22, upwardly and rock the elbow lever to raise the feeder to its limit of upward movement. When the striker arm slips past the cam face of said cam toe 23, said toe and push rod are forced down by a retractive spring 24, and the elbow lever is rocked to force down the feeder to perform its feeding stroke and carry the letter downwardly from the letter bed or feed way through the throat formed by spring fingers 13, and the front edge of the bed. In the example shown, the feeder is positively moved on its return stroke by the driving power, while on its feeding stroke it is actuated by the spring 24, hence on its feeding stroke, the feed block is yieldingly driven and can yield or even stop at any point in its feeding stroke and thus avoid mutilating letters should a letter for any reason jam, wedge or refuse to be moved by the feeder. In other words the feeding stroke is elastic so that the feeder can adapt its stroke to the resistance of the letter being moved.

25, is a stop limiting the downward movement of the lift rod 22, and connected parts. This stop also forms a cushion or buffer to break the shock when the cam toe drops from the striker arm. The stop 25, can be formed of a block of rubber mounted on the push rod and engaging a stop or plate 26, rigid with the frame.

The rod 15, carrying the feeder block 14, passes through a transverse slot in the cross bar 12, see Fig. 7, which forms a guide therefor and permits swing of the rod to move the feeder block toward and from the front faces of the letters as the block reciprocates.

27, is a spring secured to the cross bar 12, and bearing against the rod 15, to yieldingly press the feeder block toward the letters.

The printing mechanism is located at and generally below the front edge of the letter bed or discharge throat from the letter way. 28 is the horizontal impression surface shaft arranged transversely beneath the front end of said letter bed and at its ends mounted in said extended ends of the front frame uprights. One end of said shaft is extended and provided with pulley 29, receiving and driven by belt 7, to continuously rotate said impression roll shaft. 39, is preferably soft impression roll mounted on said shaft, and 31, 31, are milled feed surfaces mounted on said shaft.

The impression surface can be composed of the cylindrical roll 30, as shown in several figures or an endless traveling impression surface 30', can be employed as shown in Figs. 1, 3, and 6. This impression surface 30', can consist of a thin flexible endless flat belt passing around and driven by the roll 30, on the impression surface shaft and from thence passing rearwardly above the case of boxes and around a suitable idler. The endless belt constantly travels and presents a fresh surface to each letter, and should ink be deposited on the belt, by any accident, said inked portion of the belt immediately moves rearwardly from the letter path and will become dry before again reaching the letter path. The feed wheels or surfaces 31, 31, are separated by a slot in intervening space about opposite the central portions in the lengths of the letters passing down over said roll or rolls mounted on the impression roll shaft.

32, is the printing roll shaft which is normally inactive, and is mounted to rotate in a vertically swinging frame comprising downwardly and forwardly inclined links or arms 33, at their free ends carrying the printing roll shaft and at their upper ends secured to a cross shaft 34, mounted to turn in the upwardly extending portions of the front frame uprights. An extended end of said rock shaft 34, is provided with a rigid arm 36, having an adjustable stop 35, to limit the movement of the printing roll shaft toward the impression roll.

37, is a retractive spring attached to said arm 36, to yieldingly hold the printing roll toward and to properly coöperate with the impression surface. Also this arm 36, can serve as a handle for swinging the printing roll shaft outwardly when it is desired to change type in the printing roll or for other reasons.

38, is the printing roll, of any suitable and desirable construction, and arranged opposite and to coöperate with the impression roll. The printing roll can be provided with any suitable printing characters and any desirable arrangement of removable type etc. If desired, the printing roll can have its surface entirely or partially reduced, to avoid contact with the letters, impression roll and the inking roll except for the printing devices or characters which can be raised, to strike the inking roll and the letters.

Before the piles of mixed letters are placed in the letter way or common source, they can, if desired, be first back stamped or postmarked and have the stamps thereof canceled by being run through canceling machines, such as now employed in post offices. The printing device shown in the accompanying drawing is designed to print or mark each letter at the proper point with a character or characters indicating the particular clerk operating the apparatus. For instance each clerk is designated by a particular number and when a clerk goes on duty to operate a distributing apparatus, he inserts type in the printing roll to print his number on each letter passing through the distributing apparatus. The printing apparatus can be timed to print the clerk's identifying character at any desired point on each letter. For instance, on Fig. 8, I show the characters printed along one end of the letter, but of course where a clerk-identifying printing device is employed, any desired kind or arrangement of printing characters can be employed to print at any desired point on each letter. By imprinting such clerk-identifying mark on each letter, mistakes etc. can be readily traced, and the use of the printed slips now loosely placed in the bundles of distributed letters can be avoided.

39, 39, are separated milled feed rolls or surfaces opposite and arranged to coöperate with the corresponding surfaces 31, of the impression roll shaft. The slots or spaces between the feed rolls of both shafts are arranged preferably in the plane of the path of movement of the feeder.

The stop 35, is preferably so arranged as to keep the rolls of the printing roll shaft from contact with the rolls of the impression roll shaft, when no letter is interposed, and the tension of the spring 37, is sufficient to hold the rolls of the printing roll shaft against the interposed letter with sufficient pressure to insure proper printing and the necessary grip on the letter to insure proper feeding.

The printing roll shaft is designed to rotate only when a letter is inserted between the printing and impression rolls, and to then make only a complete revolution. A stop mechanism is provided to stop the rotation of the printing roll on its completion of one revolution and to release or unlock the printing roll for rotation at each feeding stroke of the feeder. The printing roll shaft is hence normally maintained at rest. The printing roll shaft can, if desired, be arranged as an idler to be driven, when released, by friction with a letter interposed between the printing and impression shaft rolls. However, I prefer to drive the printing roll shaft positively by friction usually from the continuously driven impression surface shaft. In Fig. 12, I show one form of driving means for this purpose, comprising friction disk 40, rigid on the impression surface shaft 28. 41, is a disk loose on the printing roll shaft and lapping the friction disk 40, and having a lateral friction flange or edge to frictionally engage with the flat face of the disk 40. The disk 41, is rigid with a hub or sleeve loose on the printing roll shaft and rigid with a flange 42, having edge teeth or notches. 43, is an arm rigid with the printing roll shaft and carrying a spring pin or pawl 44, engaging any one of the notches in flange 42. The friction disk 41, is held to rotate with the printing roll shaft through the medium of said arm, spring pin, flange and hub, and by means of said connections the printing roll shaft and the friction disk can be adjusted axially independently of each other. 45, is an expansive spring on the printing roll shaft yieldingly holding the friction flange of the disk 41, to the friction face of the disk 40, to maintain the desired friction for properly driving the printing roll shaft. This friction driving gearing is mutilated, usually by forming notch or recess 46 in the flange or lateral edge of the friction disk 41, hence when said recess 46 is opposite friction disk 40, the friction driving engagement between disks 40, 41, will be broken and the printing roll shaft will be inactive. It will be observed that when the friction flange of disk 41 is brought into contact with disk 40, the printing roll will complete one revolution and then stop as the recess 46, will then again come opposite disk 40 and the flange will be disengaged therefrom.

The locking and releasing mechanism for the printing roll can be formed by a swinging detent, dog or toothed lever 47, at its lower end fulcrumed to the frame and extending upwardly and having a shouldered end, tooth or stop arranged to ride on the circumferential edge of the disk 41, and drop into a shouldered locking notch 48, therein to hold the printing roll shaft against forward or letter feeding rotation. The notch 48, is so arranged with respect to the recess 46 that when said recess 46 is opposite the disk 40, and the printing roll shaft is out of operative connection with its driving power, said detent 47 will be in the locking notch 48, holding the printing roll shaft against forward rotation. It is desirable to release the detent 47 from its locking position at each feeding stroke of the feeder and thereby release the printing roll shaft for rotation at or before the instant the letter is forced into the printing mechanism. As a means for accomplishing this end, I show a swinging sliding cam link 49 at its lower end pivoted to the upper free end of the detent 47 and from thence extending upwardly through and sliding on the floor of a rigid encircling guide 50. A retractive spring 51 is attached to said link and arranged at an angle thereto so as to yieldingly hold the detent inwardly to the edge of the disk 41, and the link yieldingly to its limit of upward movement, and also down on the floor of guide 50. The upper end 18, of the feeder-operating bell-crank is provided with the lateral projection 52, in the path of movement of which the link 49 is normally located. The under edge of the rear end of the link 49 is provided with a cam edge 53, which rides on the bottom wall of the guide 50 as the link is forced down by projection 52 and thereby raises the rear end of the link so that the projection 52 can slip past the link before the feeder has completed its feeding stroke, see dotted lines Fig. 11. In the specific example illustrated, the feeder normally rests at its limit of downward movement with the arm 18 of the bell crank swung down and the projection 52 under the link 49 and resting against the lower edge thereof, said link resting at its limit of upward sliding and downward swinging movements with the detent 47 locking the printing roll shaft see Fig. 22. When the parts are in this position the buffer 25 rests on the stop 26 and the cam toe 23, is at its limit of downward position and located in the path of the striker arm. After the striker arm has started on its stroke or rotation, it engages the inclined cam edge or face of toe 23, and thereby elevates said toe, and swings arm 18 of the bell crank upwardly to move the feeder on its return or upward stroke and the projection 52, slides upwardly along the under edge of link 49 and by reason of the cam formation 53 of said edge, the link is forced upwardly to clear the projection 52, the link thereupon dropping down, and the projection 52 continuing on its upward movement beyond and opposite the shouldered upper rear end of the link, see Fig. 11. When the striker arm slips past the cam face of the toe 23, the spring 24 returns the same and connected parts to their normal positions and actuate the feeder on its downward feeding stroke, during which the projection moves down and engages the rear shouldered end of the link 49 and moves said link downwardly and longitudinally to free detent 47 from the locking notch 48. The detent 47 is held free of the locking notch until the letter has entered the printing mechanism and started the revolution of the printing roll, whereupon the cam edge 53, of the link will lift the link to free the same from projection 52, thereby permitting the link 49, to spring upwardly and longitudinally to its normal position and the detent against the disk 41, in readiness to drop into notch 48 when the disk completes a revolution. The printing characters of the printing roll are so arranged with respect to the locking notch 48 and the stroke of the feeder, that the characters will imprint at a predetermined portion of each letter, and the parts can be adjusted to vary the printing point. By means of the spring pin 44, connecting the printing roll shaft and disk 41, the relative positions or locations of the printing characters and locking notch can be varied to suit conditions.

The arrangement of parts in the printing mechanism so that the printing roll shaft rotates only when a letter is introduced into the bite between the rolls of the printing mechanism, prevents offset or deposit of ink on the impression roll. If the stop mechanism should be released to permit rotation of the printing roll, and the feeder should fail to force a letter into the printing mechanism, no rotation of the printing roll would take place and hence the inked printing characters would not come into direct contact with the impression surface. The impact of the letter driven by the feeder, into the bite of the rolls of the printing mechanism will, through friction, move the printing roll shaft sufficiently to bring the friction flange of disk 41, into operative engagement with the constantly rotating disk 40 and hence positively drive the printing roll shaft during the remainder of its revolution to imprint the letter and discharge the same to the exposed inspection position. When the printing roll completes its revolution, the recess or break 46, in the friction flange assumes its position opposite and breaking the frictional driving contact between the friction disks 40, and 41, at the instant that the detent 47 drops and locks the printing roll in the proper position and prevents the same moving past the proper stopping point which might again bring the friction flange into engagement with the disk 40, and continue the rotation of the printing roll.

In Figs. 10, and 10ª, a somewhat different arrangement of driving and stopping mechanisms for the printing roll is shown. The driving gearing and stop are shown at the left hand side of the machine. The end of the continuously rotated impression roll shaft carries a disk 60, rigid therewith and provided with a friction circumferential driving edge. The printing roll shaft is provided with a flexible shaft section or extension 61 secured thereto to rotate therewith and formed by a coiled spring. The outer end of this spring is secured to a short shaft section 62, rigid with mutilated friction driven disk 63, having its edge in friction contact with the edge of the disk 60. The short shaft section 62, is mounted to rotate in the adjustable arm or bracket 64, adjustably secured to a frame bar. The arm 64 is normally rigidly secured, but the securing devices are adjustable so that said arm can be loosened and moved to bring the edges of the disks 60, 63, toward or from each other to take up wear or for other reasons. The driven friction disk 63, is formed with the edge recess or notch 65, to throw the disks out of operative engagement at the completion of each revolution for the same purpose as hereinbefore described in connection with the arrangement shown particularly in Figs. 12, 13, and 14. The flexible shaft section 61 permits the free swing of the printing roll and its free roll independently of the shaft end 62, and its driven mutilated friction disk.

The stop mechanism of the arrangement of Fig. 10, comprises a pin or projection 66, from the outer face of the friction disk 63, and a stop or detent 67 in the form of a hook or lateral arm rigid with one end of the transverse rock shaft 68 extending across the frame and at its opposite end rigid with a crank arm 69, at its free end pivoted to the front end of the push or slide link 49, previously described in connection with the detent 47, of other figures of the drawings. The longitudinal movement of the push link 49, rocks the shaft 68 to throw the hooked arm or detent 67 into and out of the circular path of movement of the pin 66. The detent holds the printing roll against rotation with the friction disk 63 out of operative engagement with the driving disk 60. The spring 51 attached to slide link 49, yieldingly holds the detent in the path of the locking projection. The slide link operates, the parts as hereinbefore described, at the proper movement to free the detent from its locking position with respect to the mutilated friction disk.

The feed rolls or surfaces 31, 39, of the impression surface and printing roll shafts are usually milled, corrugated or otherwise roughened to positively take hold of and accurately feed the letters, and hence, although said feeding surfaces do not come into immediate contact and the printing roll shaft is at rest, yet by reason of the spring pressure on the printing roll shaft and the continuous rotation of the impression surface shaft, the entrance of a letter between the rolls will cause sufficient friction and pressure on the rolls of the printing roll shaft to start said shaft on its feeding rotation, and bring the friction driving surfaces into operative contact, so that when a letter is in the printing mechanism, the printing and feed rolls and impression surface are positively driven to properly and rapidly feed the letter. Also the positive friction driving means for the printing roll insures a complete revolution thereof at each stroke, as the circumference of the printing roll is in length greater than the width of the letter; the friction device completes the rotation after the letter has been discharged from the printing rolls.

54, is the inking roll, of any suitable and desirable construction arranged in front of the printing roll to engage the raised printing portions and characters thereof, only. This inking roll is mounted to freely revolve on a shaft or rod 55, parallel with the printing roll shaft and rigid with an upright swinging arm 56, at its lower front end mounted to turn on the front cross bar 57, secured to the front frame uprights. This arm 56 swings toward and from the printing roll shaft and is extended upwardly and at its upper free end carries an adjustable stop 58 engaging one of the swinging arms or links 33, which carry the printing roll shaft. This stop limits the movement of the inking roll toward the printing roll, and as the arms 33, swing, the arm 56, and inking roll are correspondingly moved with the printing roll to maintain the relative positions of the printing and inking rolls. The inking roll is yieldingly held to its limit of movement toward the printing roll, by a retractive spring 59, having adjustable connection with the arm 56, see Fig. 6.

A suitable letter support, platform, rest or way 71 extends from the printing mechanism downwardly and forwardly at an inclination to form the exposed inspection point, platform or station and to meet the vertically moving main way or vertical letter conveyer, but the inspection station can be suitably located or arranged at any desirable point according to the arrangement of letter conveying devices or key board of the particular machine. This support 71, can be formed in various ways, for instance, I show a plate for the purpose. The lower end of the plate extends vertically at and approximately parallel with the inner letter engaging face of said conveyer. This plate extends transversely between and is fixed to the front uprights of the main frame and its transverse upper edge terminates near the bite between the rolls of the printing mechanism so that the letters discharged from said rolls will move downwardly onto said plate with their flat back faces resting on and transversely of the plate. 72 are downwardly projecting curved or bent spring fingers arranged above and with their lower extremities yieldingly bearing down on the top or front surface of said plate or letter bed 71. These fingers are at their upper ends secured to the swinging arms 33, carrying the printing roll shaft. Each letter as it leaves the printing mechanism and moves down plate 71 slips under the ends of said spring fingers which are designed to guide and hold each letter down in its proper position, and retard the downward movement of the letter and hold the same in proper position to be engaged by the pusher hereinafter described. These springs are also for the purpose of lining up the letters with their long edges in the desired horizontal position, should a letter assume a tilted position in passing down from the letter or support for the common pile.

73, is a yielding transverse stop or gate extending across the lower end of the inclined exposed portion of the plate 71. This stop, in the example shown, consists of a vertically swinging flat metal plate at its upper longitudinal edge formed to turn or rock on the front top cross bar 57, from which the plate extends downwardly and inwardly to the plate 71. The lower end of said gate 73, is shown slotted inwardly to form fingers 74 extending through vertical slots 75, in the plate 71. The walls at the upper ends of slots 75 limit the upward swing of said fingers at the free edge of the gate, and a spring 76 is provided to yieldingly hold the free end of said gate upwardly to its limit of upward movement to normally close the lower end of the letter support formed by plate 71, against the downward passage of letters to the main way conveyer. The letter from the printing mechanism is discharged onto plate 71, and is arrested by said gate. The lower long edge of the letter rests against said gate and the letter is squared or lined up to the desired horizontal position, if this operation is not performed by the spring fingers 72.

The apparatus is so arranged that the letter support 71, is exposed and unobstructed to the view of the operator at the front of the machine, and the swinging stop 73, holds a letter on said support with its addressed face exposed to the view of the operator just above the horizontal plane of keys. The initial feeding and printing mechanisms, hereinbefore described, at each stroke, deposit a letter at said exposed position for inspection, and the letter thus deposited and held for inspection remains in such position until the initial feeding and the printing mechanisms are again operated to make another stroke and bring down another letter to said exposed inspection station or point, whereupon mechanism is brought into play to remove the previously fed, printed and inspected letters and deliver the same to the distributing letter conveying mechanisms. It will hence be noted that the letters are moved individually to said exposed inspection point, and before another letter is delivered to said point the previous letter is removed therefrom. When a letter is delivered to said exposed inspection station or point, it is there stopped and held until the operator can see and determine that the letter is in proper condition and position for distribution, whereupon the operator reads the addressed face of the letter and then presses or moves the key which controls the devices to cause delivery of said letter into the particular box called for by the address of the particular letter. The operative movement of the key brings into play mechanism which will move the inspected letter from said exposed point, and locate another letter at said point, for inspection and finally, distribution.

Usually the device which moves the inspected letter from the exposed inspection station to the distributing devices, is controlled by and moves simultaneously with the letter feeder. For instance, I show a vertical slot arranged transversely of the upper portion of the plate 71, at a point opposite the annular grooves in the feeding rolls or surfaces of the impression and printing shafts.

77, is a vertically swinging or movable link or pusher rod at its upper end, at 78, pivoted to the rod 15 carrying the feeder block 14. This rod 77, extends downwardly and forwardly over, and if desired resting on, the feed block and down through the printing mechanism, passing through said slots in the feeding surfaces, and between the impression and printing roll shafts. The lower end of the rod 77, extends beyond the printing mechanism and into the said slot in the upper end of plate 71. The lower end or head of said rod 77, is enlarged and notched or rabbeted at its under edge to form a downwardly facing letter pushing shoulder 79, in its lower edge as shown. The letters pass from the common pile and through the printing mechanism and onto the exposed inspection station, under said pusher 77, which rests loosely on and transversely of the front face of the letter on said station, as shown in Fig. 8, with the shoulder 79, of the pusher a distance below the top edge of the letter. In this position the feeder and the pusher are in their normal positions, that is at their limits of downward movement. These parts remain in this position, until a key is moved to start the mechanism which causes the distribution of the letter on said station. Thereupon the feeder makes its return stroke and carries the pusher upwardly so that the shoulder 79, of the pusher slips past the upper edge of the letter and drops down behind or above the same with the upper forwardly projecting end or lip of the pusher resting on the outer face of the letter. When the feeder makes its feeding stroke, the pusher pushes the letter on the inspection station, downwardly from under the spring fingers 72, and with sufficient force to cause the lower edge of the letter bearing against the stop 73, to swing said stop down and the letter past the same into the bite between the lower end of the plate 71, and the main letter way conveyer, which conveyer immediately pulls the letter completely past said gate and propels the same downwardly on its passage to one of the letter boxes. The gate immediately returns to its normal closed position in readiness to stop the next letter following closely behind the one just started on its course to a letter box. In the specific example shown, the letter boxes 80, are formed or arranged into what might be termed a case, within the top, upright and bottom bars of the main frame. The boxes are suitably secured and supported in the frame and are closely arranged in horizontal longitudinal rows approximately throughout the length of the frame, and the boxes are also arranged one above the other in vertical rows. The ends of the boxes at one side of the case, are preferably open for the removal of the letters therein, while the sides and opposite ends of the boxes are usually closed. The top of each box is formed with an opening to receive the letters. The horizontal rows of boxes are preferably arranged one above the other in the same vertical plane and the rows are separated sufficiently to form branch or box letter passages 81, over the open tops of the boxes. Each branch or box passage extends throughout the length of its row of boxes and at its front end opens into the main or vertical letter way or passage at the upper end of which the letters are received and said exposed inspection station is located. As the letters are rapidly discharged into the boxes through their open tops with considerable force, it may be sometimes desirable to provide suitable means to prevent the letters dropping or falling from the open egress ends of the boxes which might occur particularly when a number of letters are piled up in a box. As an example of means which might be employed for this purpose, I show, in Fig. 27, each horizontal row of boxes provided with a yieldingly upheld vertically swinging shelf, door, or stop 198, arranged at the exterior of the case of boxes and in front of the open ends of the boxes. For the purpose of avoiding confusion I have not shown these shelves 198, applied to the general views, and I do not wish to limit my invention thereto. Each shelf 198, is arranged horizontally and in length is equal to the length of its row of boxes and at its lower horizontal edge is hinged in the plane of the floors in the row.

199, is a spring yieldingly holding the shelf upwardly in front of the open ends of the boxes to prevent letters dropping from the boxes. Said spring holds the shelf against a stop or stops 200, which limit the upward swing thereof. The operator can easily press down the shelves in removing the letters from the boxes and the springs will automatically return the shelves to their normal positions.

Horizontal transverse pulleys 82, are arranged at the front end of the box passages 81. Each box passage contains such a pulley which has a diameter less than the vertical width of the passage. Each pulley is carried by a transverse shaft mounted in the front uprights of the main frame. At the rear end of each horizontal row of letter boxes is mounted a large horizontal transverse pulley 83. The pulleys 83 are arranged one above the other and are carried by transverse shafts mounted in the rear uprights of the main frame. The diameter of each pulley 83, is slightly greater than the vertical distance between two adjacent box letter passages.

84, is a horizontal transverse pulley located beyond the upper rear corner of the main frame and carried by adjustable frame 92.

85, is a horizontal transverse pulley mounted between the rear uprights of the frame and below the plane of the case of boxes.

86, is a horizontal drive pulley rigid with the drive shaft 4.

87, is the endless conveyer passing around and driven by the driving pulley 86, and passing over the various pulleys 82, 83, 84 and 85, and through all of the box passages. This box passage conveyer passes rearwardly from the under portion of the driving pulley to the pulley 85, and from thence upwardly in rear of the machine to the pulley 84, and from thence forwardly over the box case and under the support or bed for the common mixed pile of letters to the top front pulley 82. The conveyer passes around this pulley and rearwardly close over the top horizontal row of boxes and traversing the open tops of all the boxes in said row and in letter feeding relation with the floor formed by the gates normally closing the tops of said boxes. At the rear of said top row of boxes the belt passes downwardly along the top pulley 83, and from thence forwardly again through the top portion of the second box passage from the top, to the front pulley 82, of said passage and from said pulley back again in the same passage close over the open tops of the boxes of the second row and in letter feeding relation with the gates of said boxes. The conveyer is in this way continued and wound in and out through all the box letter passages until the bottom pulley 83, is reached and from the lower face of this pulley the conveyer passes to the top of the driving pulley 86. The endless conveyer is thus so arranged that when the driving pulley is driven in the proper direction, the different portions of the conveyer will move as indicated by the arrows in Fig. 3, with the lower letter engaging portions in all the box passages moving rearwardly to receive letters from the main conveyer and convey the same to any box. In each box passage the upper return portion of the conveyer is moving to the front but the lower letter engaging portion is moving rearwardly. It will hence be noted that all the box passage conveyers move at the same rate of speed and are all really formed by a single endless conveyer.

Suitable means can be employed to take up slack and maintain the endless conveyer at the desired tension. For instance, the frame 92, at its free end carrying pulley 84, can be mounted to swing vertically to tighten or loosen said conveyer, and can be provided with a set screw 93, to hold said frame in the necessary adjustment to maintain the conveyer at the desired tension. This endless conveyer is usually composed of two or more flat parallel separated endless friction belts arranged to move together as one conveyer and at the same rate of speed and under the same tension.

The main way or vertical conveyer 91, is also, preferably, a continuously moving endless friction conveyer usually composed of two or more flat endless separated parallel friction belts moving as one conveyer and maintained under the same tension. The conveyer 91, passes around a pulley 88, adjacent to and parallel with driving pulley 86, and mounted in the otherwise free end of a vertically swinging frame 90, at its lower end pivoted to a suitable support so that the frame can swing to move pulley 88, to and from pulley 86 and bring the outer flat faces of the conveyer belts on the two pulleys in direct frictional driving contact at points between the two pulleys see Figs. 1, 3 and 5.
A spring 89, is connected with swinging frame 90, to yieldingly hold the pulley 88 toward the driving pulley 86, and the belts of conveyer 91, in frictional contact with the belts of conveyer 87, and at the same rate of speed. The upper and lower plies of the belts of conveyer 91, extend about horizontally from the pulley 88 forwardly beneath the case of boxes to pulleys about at the lower end of the main letter way which communicates with all branch or box passages hereinbefore referred to.

94, is a usually vertically adjustable guide or supporting pulley carried by a suitable upright. This pulley is not essential, but when employed upholds the lower plies of and tightens the belts forming the main way conveyer 91.

At the front portion of the frame, the lower forwardly moving plies of the main way conveyer 91, pass under and then upwardly from a transverse horizontal guide pulley 95, between and carried by a shaft mounted in the front vertical uprights of the box case. The rearwardly moving upper plies of the conveyer 91, pass under and then extend up from a guide pulley 96, parallel with pulley 95, and also carried by and between the uprights of the case of boxes. The pulley 96, is shown located above and adjacent to and inwardly from the vertical plane including the outer portion of pulley 95, and the belt plies moving up therefrom. The outer ply of the conveyer moves upwardly from pulley 95, and extends vertically in front of the case of boxes to a point above the same and immediately under the throat from the exposed letter inspection point, hereinbefore described, where the letters are received from the printing mechanism. At a point just under the stop 73, is located the horizontal transverse pulley 97, over which the belts of conveyer 91 pass. The conveyer moves inwardly over the top of said pulley and downwardly at the inner side thereof in close contact with the smooth outer face of the wall 98, forming, in effect, a downward continuation of the plate or support 71, of the exposed letter inspection point.

Devices are preferably employed to yieldingly hold the pulley 97, pressing the conveyer against the vertical wall 98, to maintain the desired frictional pressure for gripping and carrying the letters down, and also permit the said roller to move outwardly to accommodate letters of different thicknesses. As a means which might be employed for this purpose, I show an upwardly and inwardly extending swinging frame 99, at the upper free end of which said roller or pulley 97, is mounted. This frame is fulcrumed at its lower end to a part rigid with the main frame so that its upper end can move toward and from the wall or letter slide way 98. Usually a spring device is employed to yieldingly hold the frame 99, with the pulley 97, at its limit of inward movement. For instance, I show an arm 100, rigid with frame 99, and depending from the lower end thereof, with a spring 101, yieldingly holding said arm against a stop 102, carried by a front upright of the main frame (see Figs. 2 and 7). This stop limits the movement of the pulley 97, and conveyer toward the wall or letter slide way 98.

The vertical letter slide way or wall 98, is arranged throughout the length of the main letter way and is arranged to permit passage of letters to any one of the branch or box letter passages. The inner ply of the main letter conveyer extends from the upper pulley 97, downwardly along said wall 98, to the lower pulley 96, and moves downwardly rapidly along said wall. This wall or letter slide way 98, can be formed by metal plates secured to and carried by brackets or arms 103, rigid with the front uprights of the main frame (see Fig. 9). The wall 98, preferably extends beyond the outer side edges of the conveyer, and if desired can be formed with parallel longitudinal slots or grooves parallel with and to receive the belts making up the main way conveyer. In the particular example illustrated, the main way conveyer is made up of two parallel flat endless belts, separated a distance apart, and the longitudinal slots or spaces in the wall 98, are spaced a distance apart to receive said belts so that, when no letter intervenes, the belts will travel in said longitudinal spaces or slots. However, the wall need not be slotted, as the belts can move against the outer face thereof. Opposite the front end of each branch or box letter passage, the letter slide-way or front wall 98, is formed with a transverse opening or lateral letter passage. These openings are bridged vertically by the conveyer belts and are normally bridged vertically (excepting the last or lower opening) by suitable movable letter gates, guides or deflectors which normally form continuations of the wall or letter slide-way across said openings. Usually, each gate, guide or deflector consists of fingers 104, all rigid with a transverse rock shaft 105, mounted transversely of the wall at the lower end of the transverse letter throat or opening therethrough. The lower ends of the fingers can extend into slots in the edge or edges of the wall forming the lower end of said transverse opening. The fingers of the gate are usually parallel with each other and alternate with the conveyer belts, that is the fingers are arranged between and also at the outer edges of the belts and parallel therewith. The fingers extend vertically across the transverse opening and their upper free ends can project into slots in the edge or edges of the wall terminating the opening at the top. When each gate is in its normal position, the letters moved by the conveyer slide along the outer edges of the fingers and across said openings. Suitable devices are provided, as hereinafter set forth, whereby any gate can be swung outwardly to carry the upper free ends of the fingers outwardly beyond the outer face of the wall or slide-way and the inner plies of the belts, whereby the lower edge of a letter moving down the wall will be caught and the letter turned inwardly through the opening and along the inner edges of the fingers of the gate, the letter being thereby stripped from the conveyer and front wall and deflected inwardly into the front end of a branch or box letter passage.

Suitable means are provided to guide and direct a letter passing inwardly from a transverse throat or passage in the front wall, downwardly and rearwardly to a horizontal position and into operative engagement with the front end of a branch letter conveyer. For instance, I show downwardly and inwardly curved floor or guide ways 106, from the lower ends of said transverse openings or throats in the front wall to the floors of the branch or box letter passages. Each floor 106, extends from the lower edge of its throat or transverse opening into the front wall, downwardly and rearwardly on curved lines to guide and support each letter and deflect the same from the vertical to the horizontal position. The inner end of the floor 106 terminates at the top edge of the front vertical wall of the front letter box of the row and beneath the front end of the letter conveyer of that row of boxes. If desired each floor 106 can be formed by curved spring plates alternating with the belts of the box conveyer and having their free ends yieldingly pressing upwardly to yieldingly press the front edge of the letter moving inwardly along the floor into positive frictional contact with the rearwardly moving surfaces of the box conveyer. If desired, additional spring fingers 107, (see Fig. 9) can be provided secured at their front ends and extending rearwardly with their free ends pressing upwardly through the openings in the floor 106, and against the under rearwardly moving faces of the box conveyers. However, I do not wish to limit my invention to such features, but as at present advised, I desire to provide a yielding letter throat at the front or receiving end of each box conveyer so that letters of varying thicknesses as well as cards will be properly gripped and drawn in by the conveyers.

The limit of downward movement of letters in the vertical or main letter way is located at the last or bottom letter throat or passage through the wall of said way and opposite the bottom branch or box passage. All letters passing the other throats of said way are automatically discharged inwardly through said last or bottom throat. To accomplish this result the gate or deflector 108, of said last throat is usually fixed permanently extending upwardly and outwardly from and intersecting the plane of the way and past the downwardly moving surfaces of the main way conveyer to turn the letters from said way inwardly into the bottom box or branch letter passage.

Each letter enters the upper end of the main way in a vertical position with its long edges horizontal, the rear flat face of the letter resting against and sliding down the front wall 98, the main way conveyer pressing against the outer flat face of the letter and by friction carrying the letter downwardly. If need be, a pressure device can be provided, to yieldingly force and hold the inner or downwardly moving portions of the conveyer inwardly with the desired pressure. As an example of what might be employed for this purpose, I show a presser plate or foot arranged longitudinally of the main way conveyer and between the inner and outer plies thereof. This foot, in the example shown, comprises several parallel plates 109, (see Fig. 9) with their inner flat faces parallel with and bearing against the outer faces of the inner plies of the conveyer belts. The plates are rigidly secured together by suitable cross connections or bridge pieces, and said plates are separated so that the gate fingers can swing out between them to deflect the letters from the front wall or slide way. The presser foot is carried by brackets 110, extended laterally from one of the frame uprights and arranged outwardly beyond the presser foot. Suitable expansive springs 111, are interposed between said brackets and the presser foot to yieldingly force the foot inwardly against the belts and thereby force the belts against the slide way or front wall. The presser foot is loosely connected with the brackets, as by bolts 112, secured to the presser foot and extending outwardly loosely through the brackets and provided with adjusting stop nuts on their outer projecting ends whereby the foot can rock laterally and also from either end. The springs 111, encircle the bolts and the spring pressure on the presser foot can be varied as occasion demands for the proper conveyance of the letters and to receive letters greatly varying in thickness. One presser foot can be arranged extending throughout the greater portion of the main letter way and provided with several springs and bolts, or several separate presser feet can be provided, or other suitable means can be employed to maintain the desired pressure of the conveyer belts against the letters to insure the necessary friction for the proper movement of the letters. The presser foot is so arranged that it can rock laterally on the belts as centers to accommodate letters thicker at one end than at the other.

Each row of open top letter boxes or receptacles is provided with a floor or slideway to support the letters and along which the belts move to carry the letters by frictional contact therewith. At its front end, the floor or slideway of each box passage or row of boxes terminates in the floor 106, curving upwardly and forwardly to a throat in the main letter way as hereinbefore described. The floor of each box letter passage is approximately horizontal and extends along over the open tops of the letter boxes and is usually formed by or composed of swinging letter gates, deflectors or strippers 113, and the box top walls or cross pieces 114, intervening between said gates 113. Each gate 113, consists of a horizontal cross rock shaft 115, at one end extended beyond the closed end of the box and mounted to turn in the top cross piece 114, of the box, and several parallel forwardly extending fingers rigid with said shaft and of a length to extend across and beyond the open top of the box and onto the cross piece of the next box to the front. The front edge of the cross piece is usually slotted to receive the ends of the fingers where joined to the rock shaft. The rear edge of each cross piece can be slotted or recessed to receive the front or free ends of the fingers of the next gate to the rear so that the upper edges of the fingers are flush with or below the planes of the top faces of the cross pieces to form an approximately flat letter floor or slideway offering no obstruction to the free passage of the letters thereover, when the gates are in their normal closed and horizontal positions. The belts of the conveyer lie between the gate fingers, and the gate fingers extend from their shafts in a direction opposite to that in which the letter-engaging plies of the belts move, hence should any gate be rocked its fingers will project upwardly between the plies of the belt and from the letter floor to intercept an advancing letter and deflect it from the letter floor down into the particular letter box. The ledges or cross pieces 114, project forwardly from the top edge of the vertical walls or side pieces of the box and form supports for the gate shafts and rests or stops for the free ends of the gate fingers. They also prevent the edges of the letters catching under the rear ends of the gate fingers where joined to their shafts as the letters shoot into the boxes and strike the rear side walls thereof under the top ledges or pieces 114, and a distance in rear of the gate rock shafts. The boxes usually extend outwardly beyond the gates and belts, (see Fig. 4) and said ledges or cross pieces 114, can be beveled or inclined off, to prevent interference with the passage of long letters into the boxes. The rear or end boxes of each row have permanent or fixed letter stops or deflectors 126, extending upwardly above the belts to deflect the letters into the end boxes should the letters pass the other boxes of the row.

If desired the letter engaging and moving portions of the box conveyer belts can be provided with pressure devices to maintain the desired pressure of the belts on the letters in the branch or box way conveyer. In Figs. 28 and 29, I show a device which can be employed for this purpose. I have not shown this pressure device applied in the large or general views to avoid confusion and as the application of this pressure device is obvious from said two views. I show the branch or box passage conveyers, in Figs. 28 and 29, provided with the same type of presser foot hereinbefore described in connection with the main way conveyer. Each presser foot in Figs. 28 and 29, consists of the parallel separate plates 201, pressed down longitudinally on the conveyer belts by springs 202, to hold the belts down with the desired pressure. These plates are secured together by cross pieces and are loosely hung to rock vertically from either end and also to rock transversely from either belt, by bolts passed loosely through brackets 203, and provided with adjustable stops above the brackets. The action of the presser feet 201, is the same as that of the main way conveyer presser foot, in maintaining the necessary frictional contact with the belts and letters and in yielding to accommodate letters differing in thickness and size throughout so as to propel the letters with their long edges parallel with the length of each box, and to prevent the letters assuming a position other than transversely of the belts and at right angles to the length thereof.

If desired, the apparatus can be provided with mechanism to audibly or visually indicate or signal when any box has been completely filled with mail matter, so that the operator need not carefully watch the boxes but can depend on the signal or indicator to advise him when a box of the case needs to be emptied of the mail matter packed therein. For instance, merely as an example, of one form of means for this purpose, I show each box provided with a vertically movable floor or bottom 116. In the example shown this movable bottom consists of a thin sheet metal spring plate secured along one longitudinal edge of a side wall of the box so that said plate constantly tends to spring upwardly to its limit of upward movement, see Fig. 20. The plate can be guided and limited in its upward movement by tongues or projections 117, moving in vertical slots 118, in the vertical side of the box adjacent to the free end of the plate. These tongues also prevent the letters slipping down between the side of the box and edge of the plate. As the box fills with letters the top gate thereof in closing will press and pack the letters down in the box so that when the box is filled to its full capacity, the spring or movable bottom will be forced down to its limit of downward movement by the weight of the letters and the downward pressure of the gate on the letters. This downward movement of the box bottom operates a suitable indicator, preferably, without thereby disturbing the position of any other box bottom. The box bottoms move independently of each other. The indicator shown, as a mere example from among many other devices which can be employed, consists of an audible alarm such as a signal bell and its sounding or striking mechanism 119, see Fig. 18, is located at any suitable point on the apparatus.

120 is a rock lever fulcrumed between its ends to the upper part of an upright of the main frame. A spring held trip arm 121, is pivoted to and depends from one end of said lever and is in any desired manner, connected to and arranged to operate said bell striking mechanism every time the said lever is rocked. The opposite end of said lever is fixed to a long horizontal vertically movable rod 122, arranged longitudinally above the case of boxes. The lever can be provided with a spring, as shown to yieldingly uphold the same and said rod. A series of vertical pull rods 123, are arranged outside of the closed side of the case of boxes. Each pull rod at its upper end loosely hooks over and depends from said horizontal rod 122, and extends down beside a vertical row of letter boxes, one pull rod being provided for each vertical row of letter boxes. Each pull rod 123, opposite each letter box is formed with a rigid lateral lug or shoulder 124. Each letter box bottom is provided with a rigid projection 125, projecting rearwardly through a vertical slot in the end wall of the box. Each box bottom projection rests on a pull rod projection 124. Hence when any box bottom is forced to its limit of downward movement, the projection 125, forces down a pull rod through the medium of projection 124, and thereby draws down rod 122, and rocks lever 120, and sounds the signal or alarm through the medium of arm 121. When the box bottom depressed, is relieved of its load of letters, the spring of lever 120, returns the arm operating parts to their normal positions. As the box bottom projections rest on the pull rod projections, the downward movement of the pull rods does not disturb the position of any box bottom, and any box bottom can return to its normal position without disturbing any other box bottom.

I do not wish to limit myself to the employment of a signaling or indicating device of any character, so far as other features of my invention are concerned, but I wish to broadly cover an indicating device, whether visual or audible, in connection with a distributing apparatus.

In the specific example illustrated, there are four branch or letter passages, and but three movable main way gates or letter deflectors, the deflector for the end or last branch passage being fixed. The rock shafts 105, of the movable gates 104, are provided with suitable operating mechanism whereby any one of said gates can be opened to cause discharge of a letter into a box passage controlled by such gate. Various means can be employed for operating said gates. For instance, I show each shaft 105, provided with a lateral crank arm 127, rigid with an extended end of the shaft. The free end of each crank arm is pivotally joined to the upper end of a depending pull connection 128. The three separate and independent pull connections 128 extend down at one side of the front of the machine, and at their lower ends are pivotally joined to the free ends of vertically swinging bails or levers 129, respectively. One bail is provided for each pull connection 128, and gate 104, so that said bails are independent of each other, and whenever a bail is swung down its gate 104 is opened and swung outwardly independently of the other bails and their gates. Each bail 129, is provided with a returning spring 130 (Figs. 1 and 23) yieldingly holding said gates in their normal closed positions. Each bail, in this specific example, consists of two end pieces, normally horizontal and at their rear ends connected by and rigidly secured to a comparatively long rigid horizontal rod. The front ends of said end pieces are fulcrumed to and at the inner faces of the lower portions of two front vertical upright side plates or bars of the key lever supporting frames 131, rigidly secured to and a distance in front of the front uprights of the main frame. The three bails or levers 129, are usually arranged one above the other, and parallel, when in their normal positions, and yet such a distance apart that the swing of one bail will not disturb the positions of the remaining bails. The devices for operating the bails will be hereinafter described.

The rock shafts 115, of the box gates or strippers 113, are all extended so as to project beyond the closed ends of the boxes, and each gate shaft 115, at its said outer end has a lateral crank arm 132, fixed thereto. In the specific example illustrated, there are ten vertical rows of boxes, but the boxes of the end or last vertical row have fixed stops and no movable gates, hence there are nine vertical rows of crank arms 132, see Fig. 2. A vertical lift rod 133, is provided for each vertical row of crank arms, hence nine lift rods 133, are provided in the specific example. Each lift rod is pivotally joined to the four crank arms 132, in its row. The lift rods are shown provided with rigid lateral projections loosely extending into longitudinal slots in the ends of the crank arms, although of course many other arrangements can be provided. Each vertical lift rod at its lower end is pivotally joined to the rear end of one of a series of horizontally disposed vertically rocking levers 134. In the specific example shown, nine rocking levers 134, are provided, one for each lift rod 133. These levers are independently fulcrumed between their ends to a rigid inclined frame bar 135. The levers are shown arranged in a vertical series, one above the other, and normally parallel and located such distances apart that one can be rocked to perform its function without disturbing the positions of the remaining levers. The front ends of the levers preferably end in the same vertical transverse plane. As each lever is of a different length, and as it is desirable that all said levers have approximately the same throw or range of movement in operation, the levers are so fulcrumed at various points along the bar 135, and at different distances from the vertical plane in which the front ends of all the levers terminate, see Fig. 2, as to attain said result.

Suitable means are provided to depress the front end of any lever 134, and hence raise the lift rod 133, thereof and open or swing up all the box gates in the vertical row controlled by said lift rod, independently of all other levers 134, lift rods 133, and box gates. For instance, I show nine vertically swinging independent bails 136, one for each lever 134. Each bail 136, is shown similar in construction to bails 129 and arranged in a vertical series extending upwardly therefrom. The bails 136, are normally parallel with each other and with the bails 129, and at their front ends are independently fulcrumed to the vertical side plates or bars 131, so that each bail is normally horizontal and can swing downwardly on its operative stroke independently of and without disturbing the positions of the remaining bails. The cross bar of each bail 136, rests on and extends over the front end of a lever 134, so that the depression of any bail 136, will thereby depress the front end of the particular lever 134, belonging to and represented by that bail. In other words, in the particular examples shown, each bail 136, is arranged approximately in the horizontal plane of its lever 134, so that the depression of a bail will, through the medium of the devices described, open all the box gates in the vertical row controlled by the particular lever and lift rod, and said gates will be held in the opened position so long as the bail is held depressed. When the bail is released, the parts will return to their normal positions and the gates will drop to their closed positions, by gravity, or springs can be employed normally holding the box gates closed and for the purpose of rapidly closing the same. If desired, each lift rod 133, can have a downwardly pulling spring attached thereto, for the purpose of closing the box gates and returning the levers, bails and parts connected therewith to their normal positions see Fig. 22.

A series of key levers 137 are arranged transversely of the cross bars of the swinging bails. Each lever represents a certain letter box or receptacle. For instance, in the specific example shown, there are forty letter boxes, and hence I provide forty key levers, one for each box. In this example, the key levers are vertically disposed, and closely arranged in parallelism. The upper ends of the levers are bent forwardly and each is provided with a forwardly facing or about vertically disposed push button, finger piece or key 138, adapted to receive a certain designation indicating the particular box represented by the key. The upper ends of the levers are so arranged that the keys thereof will form a bank with the keys arranged vertically and facing outwardly. This bank of keys is preferably arranged outwardly beyond the front upper part of the apparatus, as hereinbefore described, so that the operator can easily distinguish or read all the indications or designations on the keys and also see each letter halted at the exposed inspection platform or station. The key levers are arranged between the frame bars or plates 131, and certain cross pieces rigid with said bars 131, are provided to guide and separate said levers. For instance, at the upper ends of the frame bars I show a rigid cross piece or plate 139, connecting and secured to said bars, 131. This plate 139, is formed with series of transverse slots loosely receiving and permitting operative swing of the key levers which pass down transversely through said plate and are guided and held against lateral displacement as well as limited in their outward movement thereby. 140, is another rigid cross piece or plate between said bars 131, and located just above the series of bails, and transversely slotted to loosely receive and separate the key levers.

141, is the bottom cross plate rigid with the lower ends of the frame bars 131. The lower ends of the key levers pass loosely through said bottom plate and are provided with heads or stops 142, below said plate to limit the upward movement of each key lever. The arrangement of guiding plates and key levers, is such that the upper portion of each key lever has a limited horizontal or in and out movement, and each lever can also reciprocate or slide vertically or longitudinally.

Each key lever representing a letter box, excepting those representing boxes in the bottom row and those representing the rear end or last boxes of each horizontal row, has a rearwardly extending lug or shoulder 143, arranged above and resting on one of the cross bars of a bail 129, and another rearwardly extending lug of shoulder 144, resting on and arranged above the cross bar of a bail 136. Hence when a key lever representing any box, excepting a rear end box or a bottom row box, is forced longitudinally and downwardly its projection or lug 143, will rock down a bail 129, and thereby open a main way gate to the branch or box passage opening into said box, and the projection 144, of said key lever will force down a bail 136 which will open the gate of the box represented by said key. These gates are thus opened before the letter moving mechanism receives the letter intended for the box, and these gates are held open until the letter has been deposited in the particular box. In the specific example illustrated, showing forty letter boxes, there appear forty levers, twenty seven of which each have the two lugs or projections 143, and 144. The three key levers for the three rear end boxes of the three horizontal rows above the bottom row, are not provided with the box gate opening projections 144, but have the main gate operating projections 143, as any letter delivered into a branch passage will be automatically discharged into the rear box if the gate of no other box is elevated, and hence for such boxes it is only necessary to open the particular main way gate belonging to the proper branch passage. The ten key levers representing the ten boxes of the bottom row are not provided with the projections 143, for operating main way gates, as all letters passing throughout the length of the main way are automatically delivered into the bottom branch or box letter passage by the end or lower fixed letter guide or deflector in said main way. Nine of said key levers representing the boxes of the bottom row are provided with the box gate operating projections 144, so that when one of said key levers is operated, the proper box gate will be raised to intercept the letter at the proper box. The key lever 145 representing the end or rear box of the bottom row does not need to operate either a box gate nor a main way gate, and hence said key lever is not provided with projections 143, and 144, see Fig. 15. Said key lever merely operates the trip and initial feeding mechanisms to deliver the letters to the continuously moving letter conveyers which will automatically deliver the letter to the last or bottom end box without the operation of any of the movable gates. I, preferably, provide a lock mechanism for the key levers to hold all the remaining key levers against operative movement on the operative movement of one key lever. The arrangement being designed to prevent operative movement of the remaining key levers until the gates and parts set and operated by one key lever have caused delivery of the letter to the box represented by said one key lever. I also, preferably, provide mechanism whereby power, preferably, the driving power of the machine, is utilized to forcibly move any key lever to set the gates controlled thereby, hence the operator is not obliged to exercise the force and strength necessary to move the key levers sufficiently to set the gates controlled thereby.

I, preferably, provide a lock or clutch mechanism controlled by all the keys. The arrangement is such that when the operator imparts an initial movement to any key with the slight force sufficient to move said clutch or release a trip, the power of the machine finishes the stroke of the key lever.

A cam device or strike arm is provided, preferably, to lock the key levers, move the key levers and initial feeding mechanisms and control the printing mechanism, and a clutch or trip mechanism is, preferably, provided to throw said cam device or striker arm into and out of operative connection with the driving power. As examples of devices which might be employed to accomplish these various functions, I have shown various mechanisms, as follows;—146, is a horizontal countershaft arranged beneath the case of boxes and mounted in suitable pillars or supports 147, rigid with the bottom bars 1, of the main frame. This shaft is geared to and driven continuously by the main drive shaft 4. Any suitable driving connections can be arranged between the shaft 4 and countershaft 146. For instance, I show connecting shaft 148, mounted in suitable bearings and connected at one end by bevel gearing 149, to the main shaft 4, and at the opposite end connected by bevel gearing 150, to the countershaft 146. 151, is a vertically disposed ratchet wheel, usually mounted loosely on the outer projecting end of the countershaft 146, and coupled thereto to rotate continuously therewith. I usually provide a yielding or spring connection between shaft 146 and ratchet wheel 151, to avoid shock or jar as the load is thrown onto and removed from said ratchet wheel. For instance, I show a lateral arm 152, rigid with the shaft 146 and arranged beside the ratchet wheel and connected therewith by a stiff spring 153. The shaft always revolves in the same direction and hence rotates the ratchet wheel therewith, through the medium of the spring 153, which pulls the ratchet wheel around with the shaft and yet cushions the ratchet wheel or allows slight yielding thereof when the wheel is suddenly thrown into connection with the work, thereby avoiding heavy jar and shock to the parts. The ratchet teeth 154 on the outer circumference of the rim of the wheel 151, all incline or face in the same direction. 155, is a cam or striker arm normally inactive and adapted to be thrown into and out of operative connection, or into and out of gear with said ratchet wheel which acts as a driver for said arm. Said arm 155, is arranged beside and on the same axis, or an axis concentric with the axis of the wheel, see Figs. 16 and 17. Usually said arm is formed, between its ends, with a hub 156, mounted to turn freely on a rigid sleeve or bushing 157, concentrically surrounding countershaft 146, and, if need be, abutting against the hub of the ratchet wheel. In the specific example, the sleeve 157, is shown rigid with one of the shaft supports 147. If desired, a friction brake for the striker can be provided, to prevent the striker moving beyond its proper stopping point when released from the ratchet wheel. I do not wish to limit my invention in this respect, although I show a reciprocating head or brake shoe 158, extending radially through an opening in hub 156, into frictional engagement with bearing sleeve 157. The shank of said brake shoe 158, extends outwardly beside the striker and loosely through a guide, and the brake shoe is yieldingly held against bearing sleeve 157, by a spring 159, usually provided with tension adjusting means, (see Fig. 16). One extended end of the striker arm is provided with a rigid pin or journal 160, extending laterally outside of the toothed rim of the ratchet wheel, and a swinging toothed pawl 161, is mounted, near one end, on said pin so that the toothed end of the pawl can swing into and out of operative engagement with the teeth of the ratchet wheel. The arrangement is such that when said pawl is released it at once drops into operative engagement with the toothed rim of said wheel, and the pawl being caught by a tooth of said rim, the striker is thereby rotated with the ratchet wheel.

Devices are provided to permit the striker to move only a fixed distance with the ratchet wheel whenever operative connection is established between said parts. As an example, I show a pawl controlling slide or lifter 162, arranged longitudinally of the striker arm and at one end having a lateral pin 163, loosely engaging the free end of the pawl 161. A spring 164, is attached to said slide to move the same longitudinally in a direction to throw the pawl into engagement with the toothed edge of the ratchet wheel, hence said slide must be forced longitudinally in the opposite direction and against the tension of said spring 164, to raise or swing the pawl from operative engagement with the ratchet wheel and thereby stop the movement of the striker arm. The end of the slide opposite its end having pin 163 projects beyond the end of the striker opposite its end carrying the pawl, and a device, usually a trip or cam device, is provided to engage said usually beveled inclined projected end of the slide and move the same longitudinally against the tension of spring 164 to raise the pawl from the ratchet wheel and leave the striker arm at rest with said slide held in position holding the pawl elevated and released from the ratchet wheel. By moving said trip or cam device out of engagement with the slide, the spring 164, will immediately return the slide and throw the pawl into operative engagement with the ratchet wheel and again cause the striker to revolve with the wheel. The arrangement is preferably, such that the striker on being thrown into gear with the ratchet wheel, will make one complete revolution, and then the slide will be engaged by said trip or cam device and the pawl will be thereby automatically lifted out of engagement with the ratchet wheel, stopping the striker while the ratchet wheel continues to rotate.

The end of the striker 162, carrying the pawl 161, is provided with a lateral stud or projection 165, located on the opposite side of the striker arm from the pawl. This stud is rounded and can if desired have any antifrictional roll mounted thereon. As hereinafter described, this stud 165, of the striker engages devices controlling the key lever lock and the initial feeding and printing mechanisms.

The trip or cam device controlling the clutch or operative connection between the ratchet wheel and striker, can be variously constructed. For instance, I show an upright vertically swinging block 166, at its lower end rigid with a horizontal axis mounted in lateral lugs rigid with a lower frame bar. This axis is rigid with a lateral crank arm 167. The block 166, is usually arranged below the striker arm and is normally in the circular path of movement of the projected end of the lifter or slide 162, but outside of the circular path of movement of the opposite or pawl carrying end of the lifter or slide and the parts carried by said end. The said block 166, is so arranged with respect to the pawl lifter 162, that when the block is in its normal vertical position, see Figs. 11 and 17, the beveled projected end of the pawl lifter will (as the striker is completing a revolution) engage the top edge of the block 166, and thereby move said lifter longitudinally and lift the pawl and throw the striker out of gear with the ratchet wheel, and stop the movement of the striker, and leave the lifter with its lower end on the top edge of the block 166, and thereby held up in releasing position with the pawl elevated from the ratchet wheel. When the striker is to make another stroke, the block 166, is swung inwardly on its axis thereby slipping from under the pawl lifter. The spring 164, thereupon throws the pawl lifter downwardly and carries the pawl into operative engagement with the ratchet wheel and the striker is rotated with the wheel until the pawl lifter again engages and is lifted by the block 166.

Suitable operative connections are established between all of the key levers and the trip mechanism, (block 166, in the present instance) so that the initial operative movement of any of the key levers will move block 166, to trip the clutch, or in other words throw the striker into gear with its driver, in the present instance, the continuously rotating ratchet wheel. As a means which might be employed for this purpose, I show push rod 168, arranged vertically at the back of the box case and at its lower end pivotally joined to the free end of the crank arm 167, of the block 166.

169, is a stop limiting the upward movement of rod 168.

170, is a guide and stop for the rod 168, through which the rod reciprocates and in which it can move or swing laterally. The guide has an elongated slot to permit the vertical reciprocation and lateral movement of said rod 168, and to limit the lateral movement thereof. 171, is a retractive spring attached to said rod 168 and arranged at an angle to yieldingly hold rod 168, upwardly against stop 169 and at the same time to yieldingly hold the said rod forwardly and laterally against the front end wall of the elongated slot of guide 170. The upper end of the rod 168, is formed with an upwardly and forwardly inclined front edge forming a cam 172, to engage the guide 170, as the rod 168 is depressed, to force the said rod rearwardly during its downward reciprocation, for the purpose hereinafter mentioned. The rod 168, is also provided with an upwardly facing shoulder 173.

174, is a rearwardly extending approximately horizontal stiff crank or rock arm at its rear end resting on the shoulder 173. At its front end this arm 174 is rigid with a rock shaft 175, arranged horizontally and transversely at the front of the apparatus and usually mounted in suitable lugs rigid with the frame bar 131. This rock shaft 175, is rigid with an upwardly extending universal bail 176, the cross or universal bar of which extends transversely of the upper portions of all the key levers and behind the same and in contact with the rear edges thereof. A spring 177, is provided to yieldingly hold the arm 174, to its limit of upward movement, see Fig. 11, and consequently hold the bail 176, at its limit of outward movement with its horizontal transverse universal bar pressed forwardly against the rear edges of all the keys. When any one of the key levers is pressed rearwardly by the finger of the operator the universal bail 176, will be swung rearwardly thereby swinging the arm 174 downwardly. The rear end of said arm by engagement with the shoulder 173, will force the push rod 168, downwardly and will thereby swing the block 166, laterally from engagement with the pawl lifter and hence throw the striker arm into gear with its driver. The downward movement of the rod 168, will cause the cam edge 172, to throw the rod 168 laterally until the shoulder 173, moves back out of engagement with the rear end of the arm 174 thereupon said shoulder will slip past the free end of the arm 174 and the spring 171, will return the rod 168 upwardly and forwardly to its normal position, and will thereby return the trip 166, to its normal position ready to engage the pawl lifter and throw the striker out of gear with its driver on the completion of one revolution. When the key lever causing these operations returns to its normal position so that the bail 176, and arm 174, can be returned to their normal positions, by the spring 177, the free end of the arm 174, in moving up to its normal position will engage the lower inclined edge of the shoulder 173, and press the rod 168, laterally so that the end of said arm can slip past said shoulder and assume its normal position above the same, see Figs. 11 and 22. It will hence be noted that the initial inward movement of any key lever will trip the clutch mechanism and throw the striker into gear with its driver and this operation occurs before the key lever is forced downwardly to set the letter gates and before the initial feeding and printing mechanisms are operated by the rotation of the striker.

The first operation performed by the striker during each stroke, in the specific example illustrated, is that of lifting a horizontally disposed toe or lever 178, at its front end fulcrumed to a front frame upright and from thence extending horizontally and rearwardly over the striker and into the circular path of movement of the lateral projection 165, of the striker. This toe is formed with a shallow depression 179, in its under edge to receive the striker projection 165, when the striker is in its normal vertical inactive position, see Figs. 11 and 22. This depression is designed to act as a brake in holding the striker in its normal position and to assist the same in completing its stroke and in preventing the same from moving beyond its normal position at the completion of a stroke and when the striker is thrown out of gear with its driver. The end of the toe is projected a short distance rearwardly beyond said depression so that the striker just before it completes a stroke, will engage said inclined rear end of the toe and will elevate the toe against the spring pressure holding it downwardly until the projection 165 of the striker slides along the edge of the toe and enters the depression 179, and the striker completes its stroke and stops. This engagement of the striker with the toe as the striker is completing its stroke, lessens the shock between the striker and toe and tends to aid in stopping the striker at the proper point. This toe controls the key lever lock. Various mechanisms can be provided to lock the key levers so that when the machine has been set in motion by the movement of one key lever the remaining key levers will be locked against operative movement until the strokes or operations started by the depression of the key lever have been completed, whereupon the key levers will be all released and the operated key lever will be allowed to return to its normal elevated and forward position. In this connection it might be mentioned that each key lever is provided with a retractive coiled spring 180, arranged at an angle to yieldingly hold the key levers upwardly at their limits of upward movement and also to yieldingly hold the key levers laterally and forwardly at their limits of outward movement as shown in Figs. 6 and 22, hence when any key lever has been pressed to its limit of rearward movement and then reciprocated to its limit of downward movement, said key lever on being released will be automatically returned by spring 180, to its limit of upward and outward movement. As an example of a locking device which might be employed, I show each key lever provided with a rearwardly extending locking lug or shoulder 181, rigid therewith. When the key levers are in their normal positions these lugs 181, are arranged in the same horizontal transverse plane.

182, is a universal stiff locking bar arranged parallel with the plane of the row of projections or lugs 181. This locking bar forms the cross bar of a vertically disposed swinging bail at its upper ends mounted on a horizontal axis in the lugs extending rearwardly from front bars 131, so that the locking bar 182, can move forwardly against the rear edges of all the key levers and under and in engagement with all the locking projections 181, and thereby prevent movement of any one of the key levers. The rearward movement of any one of the key levers at the point where the locking bar is located is not sufficient to interfere with this locking function of said bar. The bail carrying the locking bar 182, is rigid with a rearwardly extending crank arm 183 and the rear end of this crank arm is pivotally joined with the toe 178, by a rod 184. When the toe 178 is in its normal position upheld by the striker, the rod 184 will hold the bail swung rearwardly with its universal locking bar 182 out of locking position with respect to the key levers.

185 is a retractive coiled spring yieldingly holding the toe 178, downwardly and the locking bail 182, inwardly to locking position with respect to the key levers.

A suitable stop mechanism can be provided, if desired, to limit the downward movement of the toe 178, and relieve the pressure of the locking bar 182, against the key levers when the striker is making a stroke and is out of engagement with said toe. For instance, I show a rod 186 pivotally joined to the free end of the crank arm 183, and extending upwardly therefrom and loosely through a stop plate 187 rigidly secured to the main frame. The upper end of this rod 186, is provided with a stop 188, above the plate 187, and adapted to move down to engagement with said plate 187, to limit the downward movement of toe 178, and the forward movement of the locking bar 182. If desired, I can form this stop 188 of cushioning material, such as rubber to reduce noise and jar. When the striker is in its normal position, it upholds the toe 178, and through the medium of the rod 184, and the crank arm 183, the toe holds the bail carrying the locking bar 182, inwardly from locking position so that any one of the key levers can be moved down. When a key lever is moved downwardly its locking lug 181 will move down below the horizontal plane of the locking bar 182. The movement of the key lever trips the clutch which throws the striker into gear with its driver as hereinbefore described, and after the lug 181, of the key lever depressed has moved below the locking bar 182, the striker will have passed downwardly beyond the toe 178 and hence allows said toe to drop to its limit of downward movement, throwing the locking bar 182 into locking position. The locking bar moves under the lugs 181 of the key levers in their normal positions and over the lug 181 of the key lever depressed, and will hence hold the depressed key lever against upward movement while it holds the remaining key levers against downward movement. As the striker completes its stroke it engages the rear end of the toe, thereby elevating the toe and moving the locking bar 182 from locking position, and releasing the depressed key lever and permitting the same to automatically return to its normal elevated and forward position.

As hereinbefore described, the reciprocating rod 22, actuates the initial feeding mechanism, and the stop devices of the printing mechanism. This rod is normally depressed and located at its limit of downward movement with the stop 25, on the stop plate 26, and the feeder at its limit of downward movement and the toe or lever 23, controlling said rod also at its limit of downward movement and in the path of movement of the projection 165, of the striker. The toe 23, is provided at its free end with a downwardly and forwardly inclined cam or bearing face 189, located immediately in front of the projection 165, of the striker when the striker is in its normal position at rest and when the toe is in its normal position, that is, at its limit of downward movement. In the specific example shown, I operatively connect the toe 23, with the key lever which has been initially moved, for the purpose of forcing said key lever downwardly to set the letter gate or gates controlled thereby. In this example, said connection is made through the medium of a universal depressing bar 190, arranged behind or in rear of the upper ends or portions of the key levers. Said universal bar is arranged horizontally and transversely of all the key levers and a distance in rear of the key levers in their normal positions. Each key lever is provided with a rearwardly extending lug or shoulder 191 adjacent to said universal bar, and said lugs, when the key levers are in their normal positions, are arranged in a horizontal row or straight line, parallel with and immediately in front of and in a plane slightly below the horizontal plane of said universal bar. The arrangement is such that when the key levers and said bar are in their normal positions, the bar will be free to move vertically without engaging said lugs or shoulders 191, of the key levers, but when any one of the key levers is given its initial movement, that is pressed rearwardly by a finger of the operator, the lug 191, of said key lever will pass under the universal bar into a position to be engaged and forced down by said bar. The universal bar is rigid at its ends with rearwardly extending horizontal arms 192, or levers, fulcrumed or pivoted to the side bars or front uprights of the frame, so that the universal bar can move vertically. One of the arms 192, has a rearward extension, forked at its rear end 193, to loosely embrace the reciprocating or lift rod 22, between two stops or shoulders 194, rigid with said rod, whereby the levers 192, swing as said rod is reciprocated and consequently move the universal bar vertically. One of the levers or arms 192, can be extended forwardly to form the handle 195, at the front of the machine. The spring 24, which yieldingly holds the toe 23, at its limit of downward movement, the universal bar at its limit of upward movement, and which actuates the initial feeder in one direction, is shown attached to the rearwardly extended end of an arm 192. The universal bar 190, with its lateral arms 192, in effect form a horizontally disposed and vertically swinging bail, the upward movement of which is limited by the engagement of the buffer 25, with the stop 26. Said buffer also limits the downward movement of the toe 23 and the feeding stroke of the initial feeding device.

The mail matter in post offices is distributed according to certain so called "schemes." Usually a number of distributing cases have been provided, and different cases are often arranged for different "schemes." The various boxes of each case represent various mail routes or destinations, and different cases have been used to cover different groups or "schemes" of mail routes or destinations. In utilizing my distributing apparatus, in view of its speed, it may be desirable to use one apparatus for distributing mail belonging to several groups of mail routes or "schemes" in succession. In my apparatus, I generally provide the keys, buttons or finger pieces with the "scheme" indications or titles so as to be readily read by the operator in front of the apparatus and I do not generally locate the titles of the mail routes or destinations on the boxes themselves, but on the finger pieces. In other words, each key is provided with words or other indications designating the particular mail route or destination represented thereby. To enable one apparatus to be employed for distributing according to different "schemes," without each time changing the indications on each key, I can, if desired, provide interchangeable key boards for one apparatus. Each key board is arranged according to a particular "scheme" and any desired number of such key boards can be provided and used one at a time or in succession in one apparatus and for the one case of boxes. I show in Figs. 22, 24, 25 and 26, a simple and advantageous construction particularly adapted to the machine described herein.

When the distributing apparatus is constructed to receive the example of a form of interchangeable or attachable key board shown, the construction and arrangement of the apparatus can remain as hereinbefore described, with the exception that the upper ends of the key levers 137, are not extended forwardly and provided with the rigid keys, but are formed with sockets at their upper ends and the supporting bars 131, are provided with forward extensions 205. The upper end of each key lever is formed with a top longitudinal socket 206, usually in the form of a depending slot opening upwardly through the top end of the key lever. The forward extensions 205, of the frame are suitably formed to hold and carry the interchangeable key board. For instance, I show the two frame extensions 205, which are located on opposite sides of the series of key levers, formed with depending slots or sockets 207, open at the top.

The key board consists of a rigid frame and a series of pivoted or swinging supplemental finger piece levers or short key members at their upper ends carrying the finger keys, pieces or buttons. The frame consists of rigid vertical side pieces 208, at their lower ends connected by a horizontal rigid universal bar 209, and at the front edges of their upper ends rigidly connected by the spacing and stop bar 210. At their rear edges said side pieces are connected by the rigid cross bar 211. The parallel vertical swinging key members 212, are arranged in a series between and parallel with said side pieces and at their lower ends are all mounted on the bottom universal bar 209, to independently turn or swing thereon. The front stop bar 210, is transversely slotted from its rear edge forwardly to respectively receive, guide and space said swinging members and limit the forward swing thereof. A spring device is provided to yieldingly line up or hold all said swinging members forwardly against said stop bar 210, when the key board is disconnected from the main key levers. For this purpose, I show plate springs 213, at their lower ends secured to cross bar 211, with their forwardly springing upper ends carrying a universal cross bar 214, pressing inwardly against the rear edges of all the swinging members or supplemental key levers 212, and yieldingly holding the same forwardly against said front stop bar 210, and hence properly lining up said members, so that they will be in proper position to interlock with the main key levers. Each member carries a key or finger piece at its upper end and these keys are so arranged as to form a convenient bank, as explained hereinbefore in reference to the arrangement shown in Fig. 1 and other views. The keys or finger pieces can face forwardly or can be otherwise arranged.

The key board frame is formed to project into the sockets or slots 207, to support and properly hold the frame, and so that said key board can be easily slipped into and out of place and thus readily attached to and detached from the distributing apparatus. For this purpose, I show the lower ends of the side pieces 208, at their outer faces provided with rigid elongated lugs 215, formed to fit in the slots or sockets 207, and support the key board against lateral play and uphold the same with the side pieces 208, fitting the inner faces of the supporting plates or frame extensions 205. The swinging members 212, of the key board are thus held a distance in front of and approximately parallel with the key levers 137, and each member 212, is arranged in front of and corresponds to a particular key lever 137. In other words, I preferably provide a key board member 212, for each key lever 137 and provide suitable means for operatively and detachably connecting each key board member 212 with its particular key lever 137. For instance, I show each supplemental swinging member 212, formed with a rigid rearwardly and downwardly extending angle arm or bracket 216. Each such arm extends from the rear edge of its member 212, at a point between its ends and the rear vertical free end of each arm 216, is formed to loosely enter the socket 206, in the upper end of the lever to which said supplemental swinging member belongs. The depending vertical portion of each arm 216, is elongated and rounded and otherwise so formed as to swing or rock in the socket 206, as the key board member 212, is swung rearwardly to impart the initial rearward swinging movement to the key lever 137, and also so as to then permit the key lever 137 to freely move downwardly, independently of and sliding on said vertical end of arm 216. The operation of the key levers 137 is the same where the interchangeable key board is employed, as hereinbefore described. Each key lever 137 is swung rearwardly on its initial movement by a key board member, but as the key board member does not reciprocate, the key lever 137, slides vertically on the extended vertical end of arm 216, which is sufficiently long to accommodate such reciprocation.

When an interchangeable key board is placed in the apparatus its swinging members 212, are maintained evenly in the line by the yielding universal bar and the arms 216, will all slip down into the sockets in key levers 137, so that the springs of key levers 137, will then control the members 212. It will hence be observed that such key boards can be easily and quickly slipped into and out of place in the apparatus, but I do not wish to limit other features of my invention to employment in connection with an interchangeable key board. Where desired the main key levers can have the finger pieces or keys attached directly thereto or other intermediate manually operated devices can be employed to operatively move the key levers.

It will be observed that when the machine has passed a letter to the exposed inspection point, as hereinbefore described, and the striker has returned to its normal position and is out of gear with its driver so that the key levers are all released, and the initial feeder and other parts controlled by toe 23, have returned to their normal inactive positions, the operator, having inspected said exposed letter will press rearwardly the key lever corresponding to the box in which said letter belongs. This slight rearward movement, first throws the trip 166, through the medium of bail 176, and parts operated thereby, and thereby throws the striker into gear with its driver, and this initial manually moved stroke of the key lever also brings the lug 191, of the key lever under the universal bar 190. By the time the key lever has moved its full rearward manually moved stroke, the striker has engaged the long cam face 189, of the toe 23, and has started to elevate the toe and thereby lift the rod 22, and consequently force down the universal bar 190, and through the medium of lug 191, depress or reciprocate the key lever downwardly to cause the same to open the letter gate or gates controlled thereby. The upward movement of the rod 22, at the same time moves the pusher and the initial feeder upwardly or on their return strokes.

The toes or levers 23, and 178, are so arranged with respect to each other and the striker, that the striker will not leave the toe 178, but will uphold the same until the locking lug 181, of the key lever being depressed has passed below the plane of the locking bar 182, thereupon the striker passes down out of contact with the toe 178, and permits the same to drop to its limit of downward movement, throwing the locking bar 182, into locking position above the locking lug of the key lever depressed and below the locking lugs of the remaining key levers. The striker preferably does not slip past the lower end of the cam face 189, of the elevated toe 23, until after the toe 178, has dropped to its limit of downward movement and locked the key levers. When the striker passes down from engagement with toe 23, the spring 24, moves the toe and rod 22, to their limit of downward movement and thereby returns the universal bar 190, to its limit of upward movement, and forces the letter pusher 77, down to move the said inspected letter from the exposed inspection point into engagement with the continuously moving main letter way conveyer. Said spring 24, also simultaneously moves the initial feeder down on its feeding stroke, and the parts release the printing mechanism which makes its single stroke to mark the next letter and pass in on to the exposed inspection point or station.

It should be noted that the letter gates are set on the downward movement of the universal bar and upward movement of toe 23, and that the letter is delivered to the conveyers after these operations and on the upward movement of the universal bar and return movement of the toe 23. The key levers remain locked during these operations or strokes and during each stroke of the striker. As the striker completes its stroke its projection engages and lifts toe 178, and moves the locking bar in from the key levers, but said striker completes its stroke and stops, preferably before engaging the toe 23. It will hence be observed that when the striker has completed its stroke and stopped, the depressed key lever has been previously released and with its gates returned to their normal positions and the initial feeder and pusher are at their limits of downward movement and a letter has been deposited, left at rest, on the exposed inspection point or station, in readiness to be sent to its box when the operator moves another key lever, one corresponding to the box to which said exposed letter belongs and thereby again sets the normally inactive parts in motion as just described.

It sometimes happens that a considerable number of letters should all be delivered successively to the same box. I hence show an example of one form of means which can be provided to quickly deliver such letters in rapid succession to the continually moving conveyer without requiring the operator to move the key lever of such box for every letter. For instance, the operator by holding the necessary key depressed with his finger, can by rapidly oscillating or swinging the handle 195, vertically, cause the rapid delivery of the letters to the box represented by said depressed key lever. The key lever is held depressed merely for the purpose of holding the gates set which are controlled by said lever. The striker can remain in its normal position at rest, as shown in Fig. 11, and the rod 22, reciprocated by hand by the oscillation of the handle 195, and arm 192, and its extension, and thereby actuate the initial feeder and pusher. The letters will thus be fed to the continuously moving conveyer as rapidly as the operator desires and as he oscillates the handle 195. Fig. 11, shows the striker at rest and in its normal position and the handle and its attached parts, at intermediate positions in their strokes as though being operated by hand.

I do not as at present advised, wish to limit other features of my invention to the employment of a printing mechanism. The printing mechanism can be dispensed with, and the feeder can discharge the pieces of mail matter directly to the distributing conveyers without the interposition of a printing mechanism, or mere feed or letter moving rollers can be used instead of the printing and impression rollers or surfaces, or the letters can be separately delivered to the distributing mechanism by hand or from a separate mail marking machine of any suitable construction. The bed or way for the common pile of letters might be otherwise located than at the top of the machine and the vertically moving letter engaging ply of the main way conveyer might be arranged to move the letters otherwise than downwardly.

For convenience I have herein employed the term "letters", thereby broadly meaning pieces of mail matter or any other article which my invention can be adapted to handle either in its present form or by such variations and modifications as fall within the spirit and scope of my invention.

I have very minutely described the specific constructions shown so that the various constructions and their operations can be easily understood, but I do not thereby desire to limit my invention to the constructions as shown and described but consider myself entitled to all such changes, variations and modifications as fall within the spirit and scope of my invention.

Having thus fully described my invention what I claim and desire to secure by Letters Patent of the United States is:—

1. A mail distributing apparatus wherein the letters are successively removed from a common source and distributed to various predetermined points of delivery, comprising letter moving and controlling devices for distributing the letters, means for successively removing the letters from the common source and delivering the same for distribution, and an exposed inspection station at which the letters are successively held after delivery from the common source and before being delivered for distribution for inspection of the address of each letter preparatory to setting the controlling device determining the point of delivery of such letter.

2. In combination, a letter bed having a downwardly beveled and notched front edge, means to feed the letters downwardly past said edge, and means yieldingly pressing inwardly against said edge and forming therewith a letter throat, substantially as described.

3. In combination, a horizontal letter bed, coöperating rollers arranged at the front discharge edge of said bed to receive the letters forced down from the bed along said edge, a letter platform receiving the letters from said rollers, yielding fingers at the front end of the bed and pressing to said edge, a feeder to force the letters successively under said fingers and down said edge to said rollers and simultaneously operating means to remove the letters from said platform, substantially as described.

4. In combination, a horizontal letter bed having a beveled front edge formed with notches or corrugations to engage the lower edge of each letter and retard the letters against downward movement with the letter being moved down from the bed, downwardly extending spring fingers bearing inwardly against said notched edge, and letter controlling and feeding means, substantially as described.

5. In combination, a horizontal letter bed having a letter discharge throat at its front end formed by the front edge of the bed and downwardly extending spring fingers at the front of the bed with their lower free ends pressing inwardly against the front edge of the bed, the front edge of the bed being inclined downwardly and forwardly and transversely notched, and letter feeding means, substantially as described.

6. In combination, a horizontal letter bed, a cross bar in front thereof, spring fingers secured to said bar and depending in front of the bed with their lower free ends springing against the front edge of the bed, and a feeder at the front of the bed arranged to successively feed the letters from the bed downwardly under said fingers and past said edge, said feeder comprising a reciprocating rod passing loosely through said cross bar and below the cross bar provided with a feed block, and operating means applied to the rod above the cross bar, substantially as described.

7. In combination, a letter bed having projections extending forwardly beyond its front edge and beveled downwardly and formed with series of transverse notches or steps, depending springs pressing inwardly against said projections and letter feeding and guiding devices, substantially as described.

8. In combination, a horizontally disposed letter bed, letter receiving means below the front edge of said bed, means yieldingly pressing toward the front edge of said bed to form a yielding letter throat, a frame having a cross bar a distance above said letter throat, a vertically disposed reciprocating rod passing loosely through and guided by said cross bar, said rod at its lower edge provided with a feed block, actuating means applied to the upper portion of said rod, and a spring carried by the cross bar and yieldingly holding said rod inwardly and permitting outward yielding movement of the feed block, substantially as described.

9. In a mail distributing apparatus, in combination, a letter support, a reciprocatory initial letter feeder, a reciprocatory letter mover arranged in advance of said feeder, actuating mechanism for said feeder and mover comprising a feed stroke spring and return stroke driving means working against said spring during the return stroke, said spring yieldingly driving said feeder and said letter mover on their letter moving strokes independently of said driving means.

10. In a mail distributing apparatus, in combination, a movable letter feeder having a biting portion arranged to positively take hold of and feed each letter, a letter pusher arranged in advance of and moving in unison with said feeder, means to positively and simultaneously move said feeder and said pusher on their return strokes, and a spring device to yieldingly move the feeder and the pusher on their letter moving strokes, substantially as described.

11. In a mail distributing apparatus, in combination, a letter way, an exposed inspection station, a movable initial letter feeder for successively feeding the letters from said way, a movable letter pusher for successively moving the letters from said station, a spring device simultaneously moving said feeder and said pusher on their letter moving strokes, and means simultaneously moving said feeder and said pusher on their return strokes and against the tension of said spring device, substantially as described.

12. In a mail distributing apparatus, in combination, a letter way, a letter feeder adapted to remove said letters successively from said way, a letter inspection station successively receiving the letters from said way, a letter mover successively moving the letters from said station, driving mechanism, actuating mechanism for said feeder and mover comprising a spring device yieldingly driving said feeder and mover on their letter moving strokes, and return stroke driving means for said feeder and mover working against the tension of said spring device, substantially as described.

13. In a mail distributing apparatus, in combination, letter moving and distributing mechanisms comprising a letter conveyer, an exposed letter inspection station, a reciprocatory letter pusher for successively moving the letters from said station and delivering the same to said letter conveyer, a spring connected to yieldingly move said pusher on its letter moving stroke, driving means, and pusher operating connections actuated by said driving means to move the pusher on its return stroke against the tension of said spring, substantially as described.

14. In a mail distributing apparatus, in combination, a letter inspection station, means for delivering letters successively thereto, a reciprocatory device for moving the letters successively therefrom, actuating mechanism for said device comprising a spring for moving the same in one direction and a periodically movable striker for moving the same in the opposite direction, and distributing mechanism comprising a conveyer successively receiving the letters from said device, substantially as described.

15. In a mail distributing apparatus, in combination, a series of letter receiving boxes, mechanism for distributing letters thereto comprising driving means, a letter conveyer and series of manually actuated devices, an exposed letter inspection station receiving the letters one at a time for distribution, and a positive letter mover for moving the letters from said station and delivering the same to said conveyer, substantially as described.

16. In combination, a reciprocating head, a spring held rod depending therefrom and reciprocated thereby and provided with a letter feeder block, an elbow lever connected to reciprocate said head, a lift rod connected to swing said lever, a spring connected to said rod to pull the same in one direction, a swinging toe connected to said rod to move the same in the opposite direction, and driving means comprising a striker to swing said toe against the tension of said spring, substantially as described.

17. In combination, a horizontally disposed letter way, a frame having a cross bar at the front of the way, a reciprocating carrier, actuating means therefor, a vertically disposed rod confined to said carrier and passing loosely through and guided by said cross bar and at its free end provided with a letter feed block and a spring secured to the cross bar and pressing said vertically disposed rod to yieldingly hold the feed block to the front letter in the way, substantially as described.

18. In combination, a horizontal letter bed, a pair of coöperating rolls, the bite between the rolls arranged below the front edge of the bed, a reciprocating feeder to push the letters successively to said rolls, a platform to which the letters pass from the rolls, and a pusher moving with the feeder to push each letter from said platform in advance of each letter being fed into the rolls, substantially as described.

19. In combination, a letter way having a discharge throat, a letter platform, a printing mechanism arranged between said throat and said platform, a letter feeder to remove the letters successively from the letter way, and a letter pusher to remove the letters successively from the platform, substantially as described.

20. In combination, a letter way, letter feeding means to feed the letters successively therefrom, a printing mechanism comprising rotary printing and impression members, one of said members continuously rotating, means to cause the rotation of the other member on the entrance of a letter between said members, and a lock for said last mentioned member operatively connected with and actuated by said letter feeding means, substantially as described.

21. In combination, a letter feeder, a letter printing mechanism comprising a continuously rotating member and a normally inactive member, both members arranged to rotate on the entrance of a letter between them, and a positive lock for the normally inactive member, operatively connected with the letter feeder to release said member for rotation at each feeding movement of said letter feeder and to automatically stop and lock said member on the completion of an operative rotation, substantially as described.

22. In combination, a pair of coöperating rotary members, one of said members continuously rotating and the other normally inactive, driving means between said members, to rotate the normally inactive member a predetermined distance on the insertion of a letter between said members, and a stop mechanism to lock and release the normally inactive member operating independently of the letters passing to or between said members, substantially as described.

23. In combination, a pair of rotary members, one of said members continuously driven and the other normally inactive, means for driving said inactive member from said continuously rotating member, said means thrown into action by the insertion of a letter between said members and arranged to rotate said normally inactive member a fixed distance only at each stroke, a positive lock arranged to periodically release said normally inactive member and to automatically lock the same on the completion of each stroke, and actuating means for said lock independent of the passage of letters to or through said members, substantially as described.

24. In combination, a pair of rotary coöperating members yieldingly held almost together, one of said members continuously driven and the other normally inactive and mutilated driving gearing between said members to drive the inactive member a fixed distance at each stroke and then throw the same out of gear with the continuously driven member, said gearing arranged to throw the inactive member into gear by the movement imparted thereto by the frictional engagement of said members with a letter inserted between the members, substantially as described.

25. In combination, a pair of coöperating rotary members, one of said members continuously driven and the other normally inactive, means yieldingly holding said members toward each other to grip and feed letters between them, and mutilated friction driving gearing from the continuously driven member to the normally inactive member, substantially as described.

26. In combination, a pair of coöperating rotary members yieldingly held toward each other, one member continuously driven and the other normally inactive, driving gearing to rotate the normally inactive member from the continuously driven member, said gearing being mutilated to rotate the inactive member a fixed distance at each stroke and then throw it out of gear, a letter feeder and an automatic stop mechanism for said normally inactive member actuated by said feeder, substantially as described.

27. In combination, a pair of coöperating rotary members, one of which is continuously driven and the other normally inactive, friction disks arranged to drive the normally inactive member from the continuously driven member, one of said disks being mutilated or notched, means to feed the letters between said members, and a stop or lock mechanism controlled by said feeding means and acting on said normally inactive member, substantially as described.

28. In combination, two coöperating rotary members yieldingly held toward each other to receive and move letters, one of said members being continuously driven and the other normally inactive, mutilated driving gearing from the continuously driven member to the normally inactive member, and adjusting mechanism between the mutilated gearing and the inactive member whereby the said gearing can be set or adjusted with respect to the normally inactive member, substantially as described.

29. In combination, a continuously driven impression member, a normally inactive printing roll coöperating with said member, and provided with printing characters, a friction disk rotating with the impression member, a mutilated friction disk rotating with the printing roll and driven by said first mentioned disk, and adjusting mechanism between the printing roll and the mutilated disk whereby the relative arrangement or location of the mutilated disk and the printing characters can be varied to vary the stopping point of the printing roll with respect to the printing characters, substantially as described.

30. In combination, a pair of coöperating rotary members, one of which is continuously driven and the other normally inactive, a letter feeder to move the letters successively to said rolls, a movable lock or detent normally holding the inactive member against rotation, and operative connections between said feeder and said detent arranged to move the detent out of locking position at each feeding stroke of the feeder, substantially as described.

31. In combination, a normally inoperative printing mechanism comprising rotary members, a rotary disk provided with a stop or shoulder, a swinging detent or dog yieldingly held to engage said shoulder and lock the printing mechanism against printing action, a reciprocating feeder, and operative cam connection between the feeder and detent to release the detent from locking position at each feeding stroke of the feeder and to release the detent and permit its return to locking position before the feeder completes each operative stroke, substantially as described.

32. In combination, a letter feeder, a continuously rotating impression member, a normally inactive printing roll, driving mechanism for the printing roll permitting the same to make only a single complete revolution for each letter inserted between the printing roll and impression member, and a lock for the printing roll locking the same against rotation on its completion of each revolution and operatively connected with the feeder to release said printing roll just before each letter is presented thereto, substantially as described.

33. In combination, a reciprocating feeder, a printing mechanism comprising a normally inactive rotary member having a stop shoulder rotating therewith, a swinging detent to engage said shoulder and lock the member, a spring yieldingly holding the detent into the path of said shoulder, a push rod connected to said detent to swing the same from locking position, a part moving with the feeder to move the push rod, and a cam device to release the push rod from said part before the feeder completes each stroke to release the detent and permit it to spring back into the path of the said shoulder, substantially as described.

34. In combination, a letter way, a frame, a cross bar or shaft arranged in front of the letter way, letter stops in front of the letter way, a reciprocating letter feeder to move the letters one at a time downwardly from the front end of said way, a pair of coöperating rolls just below the front end of said way and into which the letters are moved by said feeder, arms depending from said cross shaft and at their lower ends carrying the front roll, a letter platform below said rolls, springs carried by said arm and bearing on said platform, a spring yieldingly holding the front roll toward the rear roll and a stop acting on said cross shaft to limit the rocking movement thereof and to limit the inward movement of the front roll toward the rear roll, substantially as described.

35. In combination, a letter way, a pair of coöperating rotary members below the front end thereof, a letter feeder to move the letters successively from the way into said rotary members, an exposed platform onto which the letters are discharged, a stop mechanism to hold the letters on said exposed platform, a letter conveyer, and letter moving means moving in unison with said feeder to force each letter from said platform to said conveyer, substantially as described.

36. In combination, a letter way, a reciprocating letter feeder, and a letter pusher arranged in advance of and actuated by and in unison with said feeder, substantially as described.

37. In combination, rotary letter feeding rolls, a reciprocating feeder arranged to feed the letters to said rolls, and a letter pusher connected to and operated by said feeder and extending beyond said roll to move the letters after being discharged from the rolls, substantially as described.

38. In combination, a letter way, a reciprocating letter feeder to move the letters successively from the way, a platform on which each letter from the way and feeder is deposited, and a letter mover connected to and moving in advance of and in unison with the feeder and arranged to move each letter from said platform as the feeder is moving a letter from the way, substantially as described.

39. In combination, a support for the pile of mixed letters, an initial feeder, an exposed inspection point or platform on which the letters are successively delivered from said support, mechanism for individually sorting or distributing the letters, and means for delivering each letter from said inspection point to the sorting mechanism before another letter is delivered at the inspection point, substantially as described.

40. In combination, a horizontal letter way, a letter inspection platform below the front end of said way, means to deliver the letters one at a time from said way onto said platform, means to hold the letters on said platform in an exposed position, and means to deliver each letter from said platform before another letter is discharged thereonto, substantially as described.

41. In combination, a letter way, an exposed inspection platform, feeding means to deliver the letters one at a time from said way to said platform, and a pusher moving in unison with said feeding means and having a shouldered end to engage each letter on said platform and push the letter therefrom as another letter is being fed thereto, substantially as described.

42. A letter way, in combination with a reciprocating letter feeder, a platform on which the letters from said way are delivered, and a pusher pivotally joined to the feeder and moving therewith and extending beyond the same onto said platform and under which the letters move onto the platform, said pusher having a shoulder to engage the edge of a letter on said platform and push the letter therefrom as the feeder moves on its feeding stroke, substantially as described.

43. In combination, in a mail distributing apparatus, a case of letter boxes, means for individually distributing the letters thereto comprising letter conveyers, manually operated controlling means comprising a key board arranged at the front of the case of boxes, a support for the pile of mixed letters, an exposed letter inspection platform arranged adjacent to said key board, means to successively deliver the letters from said support onto said platform, and means to deliver each letter from said platform to said conveying means and before another letter has been delivered on the platform, substantially as described.

44. In a mail distributing apparatus, mechanism for individually sorting the letters comprising letter conveyers, a support for the pile of mixed letters, an exposed letter inspection station arranged between said support and said conveyers, means to deliver the letters one at a time to said station, comprising printing mechanism, and means to deliver each letter from said station and to said conveyers before the next letter is delivered at such station, substantially as described.

45. In combination, in a mail distributing apparatus, an exposed letter inspection platform, yielding fingers bearing thereon and under which the letters move, a yielding stop to stop the letters on the platform, means to feed the letters one at a time to said platform, and means to move each letter from the platform before another letter is discharged thereon substantially as desired.

46. In a mail distributing apparatus, the combination of the exposed letter inspection platform, a swinging yieldingly held stop to hold each letter thereon, a conveyer at the discharge end of said platform, and means to move each letter from the platform past said stop and to said conveyer, substantially as described.

47. In a mail distributing apparatus, in combination, an upright frame work, a case of boxes therein, means for individually distributing the mail matter to said boxes, comprising conveyers, a horizontal letter way arranged above the case of boxes, the exposed letter inspection platform arranged at the front of the frame with its lower discharge edge just above a conveyer, printing mechanism between said platform and said letter way, means to successively move the letters from said way to said printing mechanism, and means to move the letters from said platform to said conveyer, substantially as described.

48. In a mail distributing apparatus, in combination, an upright frame work, a case of letter boxes mounted therein, means for individually sorting the letters and distributing the same to said boxes comprising an endless continuously moving letter conveyer, a horizontally disposed letter way carried by the frame above the case of boxes, means for feeding the letters forwardly in said way, and devices for moving the letters one at a time from said way and delivering the same successively to said conveyer, substantially as described.

49. In a mail distributing apparatus, in combination, an upright frame, a case of letter boxes therein, means for individually sorting the letters and distributing the same in said boxes comprising an endless continuously moving conveyer extending up at the front of the case of boxes, a horizontal letter way carried by the frame and arranged above the case of boxes with its discharge end at the front of the frame and devices for feeding the letters one at a time from said way and delivering the same in a vertical position to the upper portion of said conveyer, substantially as described.

50. In a mail distributing apparatus, in combination, an upright frame, a case of letter boxes mounted therein, means for individually sorting the letters and distributing the same to said letter boxes comprising letter conveyers, a support for the pile of mixed letters arranged above the case of boxes, means for feeding the letters one at a time down at the front of the frame and in an upright position to said conveyers, and a series of key levers controlling the letter sorting means and having a key board arranged vertically at the upper front portion of the frame and formed by outwardly facing finger pieces, substantially as described.

51. A mail distributing apparatus, comprising a case of boxes, means for individually sorting and distributing the letters to said boxes comprising a series of vertically swinging upright key levers having outwardly facing finger pieces forming a vertically disposed key board at the front of the apparatus, substantially as described.

52. In combination, in a mail distributing apparatus, a letter inspection platform, a letter conveyer moving adjacent to the discharge edge of said platform, a swinging gate yieldingly held to the discharge edge of the platform to stop each letter on the platform, means to successively deposit the letters on the platform, and letter moving means to successively force the letters from the platform and past said swinging gate and to said conveyer, substantially as described.

53. In a mail distributing apparatus, in combination, an inclined letter receiving platform, a vertically swinging gate hinged at its outer end with its free end normally forming a letter stop across the platform to stop the letters thereon, a spring device yieldingly holding the gate to the platform, and a letter mover for forcing each letter from the platform and swinging the gate outwardly to permit discharge of the letter, substantially as described.

54. In a mail distributing apparatus, in combination, a common source for the mixed letters, letter sorting and distributing devices comprising letter conveying means, an exposed letter inspection station or platform between said common source and said conveying means, and letter moving devices arranged to successively deposit the letters on said platform for inspection and successively remove the same therefrom for distribution, substantially as described.

55. In a mail distributing apparatus, in combination, letter sorting and distributing devices, a common source for the mixed letters, an exposed letter inspection station, periodically movable initial feeding devices at each stroke arranged to remove a letter from said common source for delivery to said inspection station, and to simultaneously remove the previously deposited letter from said station and deliver the same to said sorting and distributing devices, substantially as described.

56. In a mail distributing apparatus, the combination of mail sorting and distributing devices comprising series of manually operated controlling means predetermining the delivery point of each letter, a common source for the mixed letters, a letter inspection station, normally inactive initial letter moving mechanism at each stroke arranged to take a letter from the common source for delivery to said station, means operating simultaneously with said letter moving mechanism to remove the previously deposited letter from said station before the next letter is delivered thereto, driving means, actuating connections for said letter moving mechanism, and means to throw the same into and out of operative connection with the driving means at each stroke of a manually operated controlling means, substantially as described.

57. In a mail distributing apparatus, in combination, a frame, series of letter boxes therein, a vertical main letter way at the front of the series of boxes and having branch letter passages to said boxes, a main letter way conveyer, a common source for the mixed letters carried by the frame above the series of boxes, means to successively feed the letters from said source and down at the front of the apparatus to said main way conveyer, and means for individually sorting the letters and distributing the same to said boxes, substantially as described.

58. In a mail distributing apparatus, in combination, a frame, series of letter boxes therein, a main way letter conveyer, means for sorting and distributing the letters therefrom to said boxes, a horizontally disposed letter way at the top of the frame above said series of boxes to receive the pile of mixed letters, a printing mechanism at the front end of said way, means to successively deliver the letters from said way to said printing mechanism, and means to deliver the letters from the printing mechanism to said conveyer, substantially as described.

59. In a mail distributing apparatus, in combination, a frame, series of letter boxes therein, a main letter conveyer, means to deliver the letters therefrom to predetermined boxes, letter controlling means determining the particular box to which each letter is delivered, a horizontally disposed letter way carried by the frame above the series of boxes, a printing mechanism interposed between said letter way and said conveyer, and letter moving devices to move the letters successively from the way to the printing mechanism and from the printing mechanism to said conveyer, substantially as described.

60. In a mail distributing apparatus, in combination, a frame, series of letter boxes therein, a main way letter conveyer, means to deliver the letters from said conveyer to predetermined boxes, a holder or letter way for the bundle of letters to be distributed, a printing mechanism, means to feed the letters from said way to said printing mechanism, an exposed letter inspection station visible from the front of the apparatus and to which the letters from the printing mechanism are discharged, and means to deliver the letters from said station to said conveyer, substantially as described.

61. In a mail distributing apparatus, in combination, a frame, series of letter boxes arranged therein, a common source for the mixed letters, a letter way extending vertically from a point adjacent to said common source, an endless continuously moving letter conveyer to move the letters vertically along said way, means to deliver the letters from said source in a vertical position to the receiving end of said way and into engagement with said conveyer, horizontal branch letter passages from said way to the letter boxes, and means to deflect the letters from said way into said passages, substantially as described.

62. In a mail distributing apparatus, in combination, an endless continuously moving friction letter conveyer, and a pressure foot yieldingly bearing against the letter moving ply of the conveyer to hold the same to the letters, substantially as described.

63. In a mail distributing apparatus, in combination, a frame, series of letter boxes, horizontal branch letter passages thereto, a main letter way common to all said branch letter passages and comprising a vertical slide way or wall along which the letters are vertically moved, an endless continuously moving conveyer ply to move the letters vertically along said slide way, each branch passage opening through said slide way, movable means to deflect the letters from said slide way and conveyer into any branch passage, endless continuously moving conveyer plies to move the letters horizontally in the branch passages, and movable means to deliver the letters from the branch passages into any box, substantially as described.

64. In a mail distributing apparatus, in combination, a frame, series of letter boxes therein, and means to individually distribute the letters from a common source to predetermined boxes comprising a vertically disposed wall or slide way, an endless continuously moving friction conveyer moving longitudinally of said slide way to carry the letters along the same, and a swinging yieldingly held frame carrying the pulley for said conveyer at one end of said slide way, substantially as described.

65. In a mail distributing apparatus, in combination, a case of letter boxes arranged with branch letter passages horizontally disposed between the boxes, means to move the letters in said branch passages, letter controlling devices determining the particular box into which each letter is deposited, a vertically disposed main letter way common to all said branch passages, an endless continuously moving letter conveyer in said main letter way, and letter moving devices successively delivering the letters vertically into the receiving end of said main way and to said conveyer, substantially as described.

66. In a mail distributing apparatus, in combination, a case of letter boxes having branch letter passages to the boxes, letter moving means therein, letter controlling means determining the particular box into which each letter is deposited, a vertically arranged slide way or wall having discharge openings into each branch passage, letter controlling means at said openings, an endless continuously moving friction letter conveyer arranged throughout the length of said slide way with its inner downwardly moving ply coöperating with the slide way to move the letters vertically along the same, means yieldingly pressing said inner ply toward the slide way, and letter moving devices arranged to successively deliver the letters in an upright or vertical position into the bite between said ply and the receiving end of the slide way, substantially as described.

67. In a mail distributing apparatus, in combination, a wall or slide way along which the letters slide on their flat faces, an endless continuously moving friction letter conveyer having one ply coöperating with said slide way to move the letters along the same, and a presser foot arranged at the outer face of said ply and pressing the same inwardly against the letters and provided with a spring device and means loosely supporting the same and permitting the foot to rock transversely and from either end, substantially as described.

68. In a mail distributing apparatus, in combination, series of letter boxes having horizontal branch letter passages thereto, means to move the letters in said passages, box letter controlling means, a main letter way comprising a wall or slide way having discharge openings to each branch passage and curved floors from said openings to the branch passages, movable letter controlling means normally bridging said openings and arranged to swing outwardly to deflect the letters through said openings, said slide way being vertically arranged at one end of the series of boxes and provided with an endless friction conveyer arranged longitudinally throughout the length thereof, and adapted to move the letters vertically from the receiving end of the slide way, substantially as described.

69. In a mail distributing apparatus, in combination, a horizontal row of letter boxes having letter ingress openings, an endless friction letter conveyer moving over said openings and arranged to deliver letters into any one of the boxes, letter controlling means determining the box into which each letter is delivered, a vertical slide way having a discharge opening, a floor curving from said opening to said conveyer, spring devices forming a yielding throat between said floor and said conveyer, letter moving means moving vertically along said slide way, and means to deflect the letters from the slide way through said opening, substantially as described.

70. A mail distributing apparatus comprising a case of boxes, the boxes thereof being arranged in several rows and a single endless continuously moving letter conveyer movable past each box and longitudinally of all the rows of boxes, whereby the one conveyer delivers letters to any box of the cage, substantially as described.

71. A mail distributing apparatus comprising several parallel rows of letter boxes arranged side by side and a single endless letter conveyer movable along each row, the letter moving portions of the conveyer for all the rows all moving in the same direction, substantially as described.

72. A mail distributing apparatus comprising a case of boxes arranged in rows with letter passages between the rows and a single endless continuously moving letter conveyer extending throughout the length of each letter passage, the letter moving plies of the conveyer in all the passages moving in the same direction, substantially as described.

73. A mail distributing apparatus, comprising several series of horizontal rows of letter boxes, the rows arranged one above the other with branch letter passages along the rows, each box open at the top into the passage of its row, swinging letter deflectors normally closing said open tops, said deflectors of each row forming a letter floor or slide way, and continuously moving endless friction belts arranged throughout the lengths of said slide ways to slide the letters along the same and in the same direction in all the passages, substantially as described.

74. A mail distributing apparatus comprising a case of letter boxes having series of branch letter passages arranged along the rows of letter boxes, a single endless friction conveyer having a series of looped or doubled portions extending throughout the lengths of said passages, pulleys for said conveyer at the opposite ends of each passage, and a single driving pulley for the conveyer, whereby the single conveyer forms the letter moving means in all said passages, substantially as described.

75. A mail distributing apparatus comprising a case of letter boxes having a series of branch letter passages opening into the boxes, a main letter way common to all said passages, a continuously moving endless letter conveyer in said main way, a continuously moving endless letter conveyer extending throughout the lengths of and common to all of said branch passages and arranged to receive the letters from said main way conveyer, said two conveyers in frictional contact with each other and driven one from the other, and means supporting and yieldingly holding said conveyers in frictional contact, substantially as described.

76. In a mail distributing apparatus, in combination, a case of letter boxes having branch letter passages thereto, a frame, an endless continuously moving main way letter conveyer common to all of said branch passages, pulleys for said conveyer comprising a pulley carried by a swinging spring held frame, an endless branch letter way conveyer, and pulleys therefor comprising a driving pulley, said spring held frame holding said conveyers in frictional contact, thereby driving the main way conveyer from the branch passage conveyer, substantially as described.

77. A mail distributing apparatus comprising a row of letter boxes with open tops, letter gates closing said tops an endless friction letter conveyer movable along said gates, and a loosely mounted yieldingly held presser foot holding the conveyer down to coöperate with the gates in moving the letters, substantially as described.

78. A mail distributing apparatus comprising a case of boxes having letter ingress openings, the ends of the boxes being open for the removal of the letters, means for discharging the letters into the boxes, and movable stops arranged at the open ends of the boxes to prevent accidental discharge of the letters through the open ends of the boxes, substantially as described.

79. A mail distributing apparatus, in combination, a series of letter boxes having ingress openings, means to discharge the letters into said boxes, each box having a movable floor yieldingly held to its limit of inward movement, and means for indicating to the operator when any floor is forced to its limit of outward movement by the letters in the box, substantially as described.

80. A mail distributing apparatus having a case of letter boxes and means for individually sorting and distributing the letters in the predetermined boxes, said case being provided with indicating mechanism connected with each box for indicating to the operator when any box is filled with letters, substantially as described.

81. In a mail distributing apparatus, in combination, letter moving and directing means, several rows of open end letter boxes, the boxes having letter ingress openings, and swinging shelves extending along the open ends of the boxes of the row and yieldingly upheld to prevent letters falling from the boxes through said open ends, substantially as described.

82. A mail distributing apparatus, comprising a case of letter boxes and an indicating device connected with all the boxes to indicate to the operator when any box is filled, substantially as described.

83. A mail distributing apparatus comprising series of letter boxes, letter moving means, movable letter controlling and guiding devices, driving means, separate controlling connections for said devices, and mechanism to operatively connect any controlling device with the driving means to set the letter controlling and guiding devices by the power of said driving means, substantially as described.

84. A mail distributing apparatus comprising letter moving means, and series of movable letter stops or guides determining the delivery point of each letter, and mechanism for connecting said guides with the driving power of the apparatus for setting the same, substantially as described.

85. A mail distributing apparatus comprising letter moving means, series of movable letter controlling devices determining the delivery point of each letter, manually operated initial actuating members corresponding to and indicating said controlling devices, and a universal bar common to all of said members and connected with and moved by the driving means of the apparatus, for the purpose described.

86. A mail distributing apparatus comprising series of letter boxes, series of manually moved members indicating and corresponding to the boxes, letter moving means, a series of letter controlling devices controlled by said members and determining the delivery point of each letter, driving means, and operating connections operatively connected with the driving means to set certain letter controlling devices when a certain member is manually moved, substantially as described.

87. A mail distributing apparatus having the series of key levers and series of movable letter gates or stops controlled thereby and driving means operatively connected to move or set said letter gates or stops, substantially as described.

88. A mail distributing apparatus having movable letter guides or stops, a series of key levers connected with and controlling said stops, and driving means operatively arranged to move each key lever to set the stops connected therewith, substantially as described.

89. A mail distributing apparatus having movable letter guides or stops, manually operated key levers connected to move said letter stops, a movable universal bar, and driving means connected to move said bar, each key lever moved by said universal bar to set the letter stops connected therewith, each key lever manually movable into operative relation to said bar, substantially as described.

90. A mail distributing apparatus having movable letter controlling devices determining the delivery point of each letter, letter moving means, series of key levers controlling said letter controlling devices, driving means normally out of operative relation to the key levers, said key levers being manually movable independently into operative relation to said driving means, said driving means arranged to move any key lever to set the letter controlling devices controlled thereby, substantially as described.

91. In a mail distributing apparatus, in combination, series of letter boxes, letter moving means, series of movable letter gates, series of key levers connected with the gates to set the same, a movable universal bar adapted to move any key lever to set the gates controlled thereby, driving means for moving said bar periodically, means for operatively connecting the driving means and said bar on the initial movement of any key lever, said key levers normally out of operative position with relation to said bar, the initial movement of a key lever placing it in operative position with relation to said bar, substantially as described.

92. In combination, a series of swinging and longitudinally movable key levers, a universal bar for moving the key levers longitudinally, the key levers normally out of operative position with respect to said bar and capable of individually swinging into operative position to be moved longitudinally by the bar, driving means, mechanism for periodically moving said bar, and means for operatively connecting said mechanism with said driving means for moving said bar on the initial movement of any key lever, substantially as described.

93. In a mail distributing apparatus, in combination, a series of longitudinally movable key levers, each key lever being yieldingly swung forward and held to its limit of upward movement, a normally upheld movable key lever depressing universal bar in rear of the key levers, each key lever capable of swinging under and being depressed by said bar, driving means connected to move said bar vertically and letter controlling devices connected with the key levers, substantially as described.

94. In a mail distributing apparatus, in combination, series of longitudinally movable key levers mounted to swing laterally, driving means, mechanism actuated by said means to forcibly move any key lever longitudinally, devices for operatively connecting and disconnecting said driving means and said mechanism, said devices actuated to operatively connect said mechanism with the driving means by the rearward swing of any key lever, and letter controlling devices controlled by the key levers, substantially as described.

95. In a mail distributing apparatus, in combination, series of swinging and longitudinally movable key levers normally held to their limits of upward and forward movement, each lever having a shoulder, letter controlling means connected with the levers, a vertically movable lever depressing universal bar in rear of the levers, any lever adapted to be initially moved to bring its shoulder beneath said bar and means connected with the driving power of the machine for moving said bar vertically, substantially as described.

96. In a mail distributing apparatus, in combination, series of movable key levers, means for locking the key levers, means for forcibly depressing the key levers, a driven member for applying said lock and actuating said lever depressing means, driving means, means for operatively connecting said driving means and said member for driving the member, and a trip device controlled by the initial movement of any key lever and controlling the means for operatively connecting said member with its driver, substantially as described.

97. In a mail distributing apparatus, in combination, an initial letter feeding device, a reciprocating connection controlling the same, driving means for actuating said connection, manually operated means independent of the key levers for reciprocating said connection and operating the initial feeder manually and independently of the driving means, key levers, letter controlling devices connected with the key levers, and letter moving means, substantially as described.

98. In a mail distributing apparatus, in combination, the series of swinging and longitudinally movable key levers each having a rear shoulder, a vertically swinging bail carrying a lever depressing universal bar in rear of the levers and shoulders, and adapted to coöperate with the shoulder of any lever in depressing the lever, a reciprocating rod connected with said bail to swing the same, an initial letter feeder controlled by said rod, a swinging toe controlling said rod, a rotary striker for swinging said toe, means for driving the striker, and letter moving and controlling devices, substantially as described.

99. In a mail distributing apparatus, in combination, longitudinally movable key levers, vertically swinging bails common to all the levers certain levers having projections arranged to engage and depress certain bails letter controlling means connected with the bails, letter moving devices, an initial letter feeder, driving means, and mechanism actuated thereby for moving said feeder and for depressing any key lever, substantially as described.

100. In a mail distributing apparatus, in combination, letter controlling means, series of horizontally disposed levers connected to said means, a series of vertically swinging horizontally disposed bails, certain levers extending under certain bails to be operatively swung thereby, and key levers, certain key levers arranged to swing certain bails, substantially as described.

101. In a mail distributing apparatus, in combination, series of movable key levers, each having a shoulder, a movable universal locking bar arranged to coöperate with said shoulders in locking the key levers, swinging arms carrying said locking bar, a pivoted toe connected to control the locking bar, and a rotary striker for swinging the toe, substantially as described.

102. In a mail distributing apparatus, in combination, an initial feeder, operating connections therefor, driving means, clutch mechanism to throw the driving means into and out of gear with the operating connections comprising a trip, a universal bar, a series of movable key levers operatively arranged with respect to said bar to move the same on the initial movement of any key lever, said bar connected to control said trip, letter controlling gates connected with said key levers, and means actuated by said operating connections to set the letter controlling gates, substantially as described.

103. In a mail distributing apparatus, in combination, an initial feeder, a swinging member connected to operate the feeder in one direction, a spring actuating the feeder in the opposite direction, series of key levers, a lock for the key levers, a swinging member controlling said lock, a key lever depressing mechanism controlled by said first mentioned swinging member, a rotary striker for actuating said swinging member, a driver, a clutch for operatively connecting the striker and driver, a trip controlling the clutch, and trip releasing mechanism controlled by the initial movement of any key lever, substantially as described.

104. In a mail distributing apparatus, in combination, the rotary driven ratchet wheel, a normally inactive striker arm, a dog carried by the striker arm to engage the toothed portion of the ratchet wheel, a slide arranged longitudinally of the striker arm and connected to lift the dog from the ratchet teeth, a trip to move said slide and to release the same, means for controlling said trip, and devices actuated by the striker arm, substantially as described.

105. In a mail distributing apparatus, in combination, a continuously rotating driver, a normally inactive driven member concentric with the driver, movable means for operatively connecting the driven member and the driver and yieldingly held in operative position, a reciprocating member connected to said means to move the same from operative position, a trip normally located in the path of said member to hold said means from operative position, means for controlling the trip, and devices operated by the driven member, substantially as described.

106. In a mail distributing apparatus, in combination, series of letter boxes, letter moving means, letter controlling devices, series of key levers, an initial letter feeder, means for actuating the same, and a hand lever connected with said means whereby the initial feeder can be manually operated, substantially as described.

107. In combination, in a mail distributing apparatus, letter boxes, means for distributing the letters to the boxes comprising a conveyer, a letter way to receive the bundle of letters to be distributed, an exposed inspection station, means to deliver the letters successively to said station comprising a feeder and printing mechanism, and a positively acting device for forcing the letters successively from said station to said conveyer, substantially as described.

108. A mail distributing apparatus comprising a series of key levers and an interchangeable removable key board therefor comprising movable members provided with finger pieces, and a frame carrying the same, said members having means to removably and operatively couple with the key levers respectively, substantially as described.

109. A removable key board for a mail distributing apparatus comprising a frame adapted to fit the frame of the apparatus and provided with a series of swinging key lever members carrying finger pieces, each member corresponding to and provided with means to detachably couple with and operate a letter controlling actuating element of a mail distributing apparatus, in combination with a mail distributing apparatus arranged to receive the letters from a common source and sort and distribute the same to various predetermined receptacles comprising letter moving means, series of letter controlling devices, and series of actuating elements therefor, substantially as described.

110. A removable key board for a mail distributing apparatus comprising a rigid frame, series of parallel swinging finger piece members fulcrumed therein, stops limiting the forward movement of said members, a spring device for lining up said members against said stop, each member provided with means for operatively and detachably coupling the same with the corresponding member of the mail distributing apparatus, substantially as described.

111. In a mail distributing apparatus, in combination, the frame formed to detachably receive and hold the frame of the detachable key board, the series of upright levers having sockets, letter controlling devices controlled by said levers, and the detachable key board comprising the frame and movable finger piece members carried thereby and provided with arms to loosely enter said sockets, substantially as described.

112. In combination, in a mail distributing apparatus, series of letter receptacles, letter conveying means, movable letter controlling guides or gates determining the particular box to which each letter is to be delivered, series of manually actuated devices corresponding to said receptacles and controlling said guides, driving means, normally inactive connections actuated by said driving means for setting any guide or series of guides controlled by any manually actuated device, connecting means for throwing said normally inactive connections into and out of operative rotation with said driving means, and mechanism controlled by any manually actuated device for operating said connecting means, substantially as described.

113. In combination, in a mail distributing machine, letter moving and controlling devices for removing the pieces of mail matter successively from a common source and distributing the same to various predetermined points of delivery, means for halting or stopping each piece of mail matter for inspection after the same has been removed from said common source and before the same has been delivered for distribution, and means whereby said letter is passed on for distribution after its address has been inspected and the controlling device determining the point of delivery thereof has been set.

114. A mail distributing apparatus comprising letter moving and controlling devices for distributing pieces of mail matter from a common source to various predetermined points of delivery, a printing mechanism, and means for halting or stopping each piece of mail matter for inspection after being imprinted and before being distributed to its predetermined point of delivery.

115. In combination, in a mail distributing apparatus, wherein the pieces of mail matter are successively removed from a common source and distributed to various predetermined points of delivery, letter moving devices comprising continuously moving friction belts, and feeding devices for successively and separately removing the letters from the common source and delivering the same to said friction belts, said feeding devices being periodically movable, and controlling devices for determining the delivery point of each letter.

116. A mail distributing apparatus wherein the letters are successively removed from a common source and distributed to various predetermined points of delivery, comprising letter moving and controlling devices for distributing the letters, means for successively removing the letters from the common source and delivering the same for distribution, and an exposed address-inspecting and point-of-delivery-determining station at which the letters are successively held after delivery from the common source and before being delivered for distribution.

117. In a mail distributing apparatus, in combination, means for successively delivering pieces of mail matter from a common source and delivering the same to an address-inspecting and point-of-delivery-determining station, continuously moving letter distributing means successively receiving the letters from said station for distribution, and controlling devices determining the point of delivery of each letter, substantially as described.

118. In combination, in a mail distributing machine, letter moving and controlling devices for removing the pieces of mail matter successively from a common source and distributing the same to various predetermined points of delivery comprising continuously moving means to which the letters are delivered after inspection, and means for halting each piece of mail matter for address-inspection after the same has been removed from a common source and before the same has been distributed to its point of delivery.

In testimony whereof I affix my signature, in presence of two witnesses.

WILLIAM BARRY.

Witnesses:
L. M. GOTWALD,
M. J. SIMMONDS.